United States Patent
Hoshizuki

(10) Patent No.: US 11,611,430 B2
(45) Date of Patent: Mar. 21, 2023

(54) ARITHMETIC APPARATUS, ARITHMETIC SYSTEM AND ARITHMETIC METHOD

(71) Applicant: AXELL CORPORATION, Tokyo (JP)

(72) Inventor: Yusuke Hoshizuki, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 229 days.

(21) Appl. No.: 16/832,628

(22) Filed: Mar. 27, 2020

(65) Prior Publication Data

US 2020/0328882 A1 Oct. 15, 2020

(30) Foreign Application Priority Data

Apr. 15, 2019 (JP) .............................. JP2019-077259
Feb. 19, 2020 (JP) .............................. JP2020-026497

(51) Int. Cl.
*H04L 9/08* (2006.01)
*H04L 9/00* (2022.01)
(Continued)

(52) U.S. Cl.
CPC ............ *H04L 9/0825* (2013.01); *H04L 9/008* (2013.01); *H04L 9/0643* (2013.01);
(Continued)

(58) Field of Classification Search
CPC ..... H04L 9/0643; H04L 9/008; H04L 9/0825; H04L 9/3247; H04L 2209/08; H04L 2209/46
See application file for complete search history.

(56) References Cited

U.S. PATENT DOCUMENTS 9,077,709 B1 * 7/2015 Dall ..................... H04L 63/18
10,275,611 B1 * 4/2019 Yu ..................... G06F 21/6218
(Continued)

FOREIGN PATENT DOCUMENTS

JP 2015-72583 4/2015
JP 6391900 9/2018

OTHER PUBLICATIONS

Shafagh, Hossein, et al. "Secure sharing of partially homomorphic encrypted IoT data." Proceedings of the 15th ACM Conference on Embedded Network Sensor Systems. 2017. (Year: 2017).*
(Continued)

*Primary Examiner* — Syed A Zaidi
(74) *Attorney, Agent, or Firm* — Wenderoth, Lind & Ponack, L.L.P.

(57) ABSTRACT

An arithmetic apparatus includes an interface and a circuity. The interface is connected to an information processing apparatus that is connected to a client apparatus and that processes data in an encrypted state. The circuitry acquires, from the information processing apparatus, encryption input data or encryption target data encrypted with a first encryption key. The circuitry decrypts the acquired, encryption input data or encryption target data with a first decryption key. Then, the circuitry executes a predetermined arithmetic operation on the decrypted arithmetic operation target data, encrypts data of an arithmetic operation result obtained by the predetermined arithmetic operation with the first encryption to key, and outputs the encrypted data of the arithmetic operation result to the information processing apparatus.

18 Claims, 9 Drawing Sheets

(51) Int. Cl.
*H04L 9/32* (2006.01)
*H04L 9/06* (2006.01)

(52) U.S. Cl.
CPC ........ *H04L 9/3247* (2013.01); *H04L 2209/08* (2013.01); *H04L 2209/46* (2013.01)

(56) References Cited

U.S. PATENT DOCUMENTS

| | | | | |
|---|---|---|---|---|
| 10,645,066 B2* | 5/2020 | Swahn | ............... | H04L 9/0894 |
| 2003/0081771 A1* | 5/2003 | Futa | ............... | G06F 7/725 |
| | | | | 380/282 |
| 2007/0234428 A1* | 10/2007 | Rash | ............... | H04L 63/02 |
| | | | | 726/25 |
| 2009/0307495 A1* | 12/2009 | Matsuo | ............... | H04L 9/0825 |
| | | | | 708/250 |
| 2010/0290627 A1* | 11/2010 | Tsuji | ............... | H04L 9/0825 |
| | | | | 380/282 |
| 2014/0095881 A1* | 4/2014 | Chan | ............... | G06F 9/5038 |
| | | | | 713/171 |
| 2015/0092074 A1 | 4/2015 | Ikeda et al. | | |
| 2017/0093570 A1* | 3/2017 | Maruyama | ............... | H04L 63/045 |
| 2017/0310479 A1* | 10/2017 | Sato | ............... | H04L 9/0822 |
| 2018/0294951 A1* | 10/2018 | Paz de Araujo | ............... | H04L 9/0891 |
| 2019/0190700 A1* | 6/2019 | Hong | ............... | G06N 3/006 |
| 2020/0034547 A1* | 1/2020 | Hackenjos | ............... | H04L 9/008 |
| 2020/0328882 A1* | 10/2020 | Hoshizuki | ............... | H04L 9/008 |

OTHER PUBLICATIONS

Harrington, Anthony, and Christian Jensen. "Cryptographic access control in a distributed file system." Proceedings of the eighth ACM symposium on Access control models and technologies. 2003 (Year: 2003).*

Solanas, Agusti, and Antoni Martinez-Ballesté. "Privacy protection in location-based services through a public-key privacy homomorphism." European Public Key Infrastructure Workshop. Springer, Berlin, Heidelberg, 2007 (Year: 2007).*

NPL Search Terms (Year: 2022).*

Notice of Reasons for Refusal dated Aug. 3, 2021 in corresponding Japanese Patent Application No. 2020-026497, with Machine Translation.

Suzuki et al., "Secure Acceleration of FPGA-enabled Server", 2019 Encryption and Information Security Symposium. Japan, 2019 Encryption and Information Security Symposium Enforcement Commission, pp. 1-8, with partial English translation.

* cited by examiner

ARITHMETIC APPARATUS, ARITHMETIC SYSTEM AND ARITHMETIC METHOD

CROSS-REFERENCE TO RELATED APPLICATIONS[

This application is based upon and claims the benefit of priority of the prior Japanese Patent Application No. 2019-077259, filed on Apr. 15, 2019. and the prior Japanese Patent Application No. 2020-026497, filed on Feb. 19, 2020. the entire contents of which are incorporated herein by reference.

BACKGROUND

Technical Field

The embodiments discussed herein are related to an arithmetic apparatus, an arithmetic system and an arithmetic method.

Related Art

In the related art, brown is a server/client model in which a server is enabled to execute a process with a high load and a process result thereof is used in a client apparatus.

When the server/client model is used, data of a process target is transmitted from the client apparatus to the server. Therefore, highly confidential data such as personal information included in the data may be leaked.

In order to deal with the above problem, it is considered to use a secret arithmetic method of performing an arithmetic operation in a state where data remains encrypted. The secret arithmetic method is largely classified into a method of using homomorphic encryption and a method of using MPC (Multi-Party-Computation).

First, the method of using homomorphic encryption is described.

The homomorphic encryption is an encryption method in which a set of a cipher text and an arithmetic operation having a homomorphic relation exists for a plaintext and a certain arithmetic operation. Strictly expressing the homomorphic encryption, it is an encryption method in which if an encryption function is denoted as Enc for plaintexts a and b and a bivariate function F(a, b) thereof, there are a cipher text c1=Enc(a) and a cipher text c2=Enc(b) and there is a function G that satisfies Enc(F(a, b))=G(c1, c2).

There are several types of the homomorphic encryption, and a case where F(a, b)=a+b is referred to as additive homomorphic encryption (AHE). In the meantime, actually, even a case where F(a, b)=a+b mod n can be regarded as substantially 'a+b' if the plaintexts to be handled are sufficiently small, so that it is also called the additive homomorphic encryption.

Also, a. case where F(a, b)=a×b is called multiplicative homomorphic encryption (MHE). In the meantime, actually, even a case where F(a, b)=a×b mod n can be regarded as substantially 'a×b' if the plaintexts to be handled are sufficiently small, so that it is also called the multiplicative homomorphic encryption.

Also, a case where both addition and multiplication arithmetic operations can be handled is called fully homomorphic encryption (FHE). The fully homomorphic encryption is currently regarded impractical, from standpoints of an amount of calculation, a key length and the like.

Also, there is Somewhat homomorphic encryption (SHE) where an upper limit is set on the number of times of arithmetic operations, so that both addition and multiplication methods can be performed and it is regarded practical to some extent.

For example, Japanese Patent No. 6,391,900 discloses technology of performing inference in a state where data encrypted using the homomorphic encryption remains encrypted.

In the meantime, the MPC is a system that performs an arithmetic operation on, encrypted data while performing communication by using a plurality of computers, and a system capable of performing more types of arithmetic operations than the homomorphic encryption is suggested.

When the additive homomorphic encryption and the multiplicative homomorphic encryption are used, there is a problem that arithmetic operations that can be performed in a state where data remains encrypted are restricted. Also, when the fully homomorphic encryption is used, there is a problem that an amount of calculation and a key length are enormous. Also, when Somewhat homomorphic encryption is used, there is a problem that there is an upper limit on the number of times of arithmetic operations.

In the meantime, when the MPC is used, there is a problem that processing performance is generally limited by a communication speed between the computers. Also, in the MPC, it is necessary to satisfy a precondition that a plurality of computers does not collude with each other for malicious intent. However, as a practical problem, it is difficult to satisfy the precondition. For example, when the plurality of computers performs malicious arithmetic operations at the same time, the encryption can be decrypted, so that data may be leaked.

SUMMARY

According to an aspect of the present disclosure, there is provided an arithmetic apparatus including: an interface that is connected to an information processing apparatus configured to process data in an encrypted state; and a circuitry configured to execute a process, the process comprising sharing a first encryption key and a first decryption key with a client apparatus while keeping the first encryption key and the first decryption key confidential from an outside, the client apparatus being configured to transmit, to the information processing apparatus, encryption target data obtained by encrypting target data as target of a process, with the first encryption key, receive, from the information processing apparatus, encryption result data obtained by encrypting a result of a process using the encryption target data, and decrypt the encrypted result data with the first decryption key corresponding to the first encryption key, acquiring, from the information processing apparatus, encryption input data encrypted with the first encryption key or the encryption target data, decrypting the acquired encryption input data or encryption target data with the first decryption key, executing a predetermined arithmetic operation on the decrypted arithmetic operation target data, encrypting data of an arithmetic operation result obtained by the arithmetic operation with the first encryption key, and outputting the data of the arithmetic operation result encrypted by the encryption process to the information processing apparatus.

The object and advantages of the invention will be realized and attained means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

Exemplary embodiment(s) of the present invention will be described in detail based on the following figures, wherein.

DETAILED DESCRIPTION

Embodiments will be described with reference to the drawings. In the meantime, the embodiments described below do not limit the inventions defined the claims, and elements and combinations thereof described in the embodiments are all not necessary for the solving means of the invention.

First, a computer system of an embodiment is described.

Figure 1:
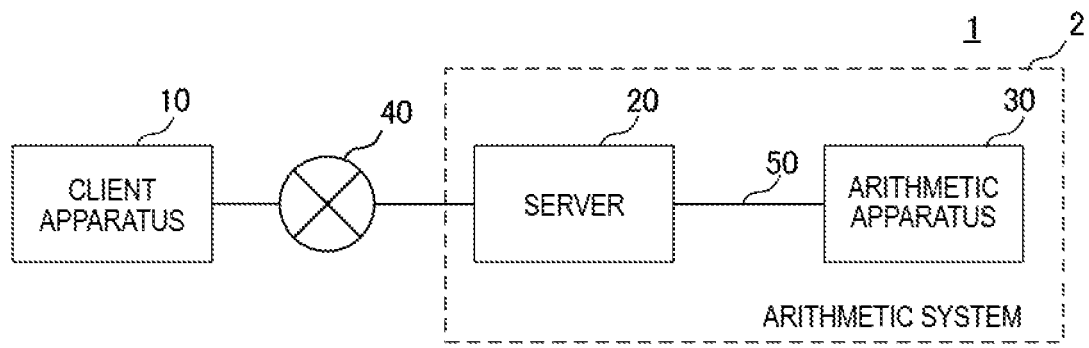
FIG. 1 is an overall configuration view of a computer system in accordance with an embodiment.

FIG. 1 is an overall configuration view of a computer system in accordance with an embodiment.

A computer system 1 comprises a client apparatus 10, and an arithmetic system 2, The arithmetic system 2 comprises a server 20, and an arithmetic apparatus 30. The client apparatus 10 and the server 20 are interconnected via a network 40, The network 40 is, for example, a LAN (Local Area Network), WAN (Wide Area Network) and the like. The server 20 and the arithmetic apparatus 30 are interconnected via a bus 50. The server 20 is an example of the information processing apparatus.

The client apparatus 10 encrypts data of a process target, transmits the encrypted data to the arithmetic system 2, receives an encrypted process result (for example, encryption result data) from the arithmetic system 2, and decrypts the encrypted process result to use a process result. The arithmetic system 2 receives the encrypted data, executes a predetermined process (for example, an inference process) on the encrypted data, and transmits the encrypted process result to the client apparatus 10. The process result is, for example, an inference result.

Figure 2:
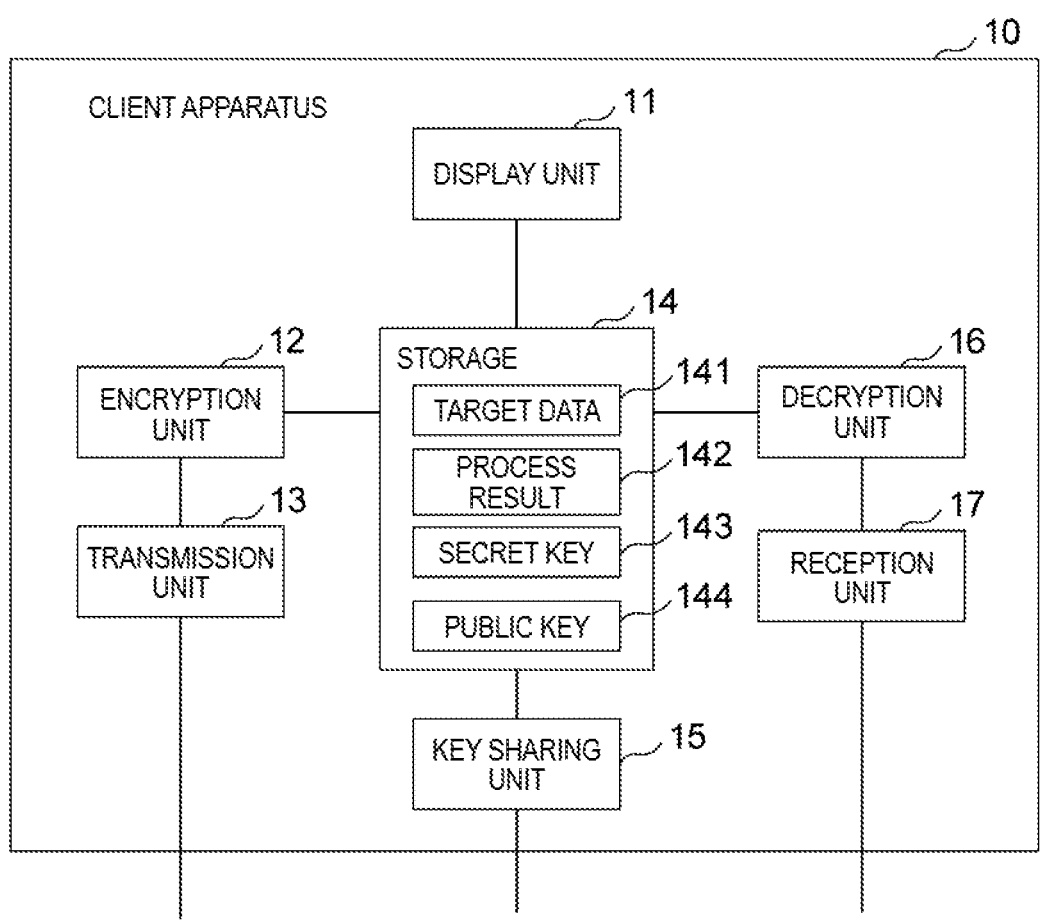
FIG. 2 is a functional configuration view of a client apparatus in accordance with the embodiment.

FIG. 2 is a functional configuration view of the client apparatus in accordance with the embodiment.

The client apparatus 10 comprises a display unit 11, an encryption unit 12, a transmission unit 13, a storage 14, a key sharing unit 15, a decryption unit 16, and a reception unit 17.

The storage 14 stores target data 141 that is a process target in the arithmetic system 2, a process result 142 that is a. result obtained by executing an inference process on the target data 141, and a secret key 143 (first decryption key) and a public key 144 (first encryption key) for decrypting and encrypting data. In the present embodiment, the secret key 143 and the public key 144 are, for example, keys for homomorphic encryption. The homomorphic encryption may be, for example, additive homomorphic encryption such as Paillier encryption and lifted-ElGamal encryption, or multiplicative homomorphic encryption. In the meantime, the process result 142 is stored when a process result is transmitted from the server 20, and does not exist for a process result on the target data 141 that is not subjected to the inference process by the server 20. Also, the storage 14 stores a common key for communication. instead of the secret key 143 and the public key 144. In this case, in descriptions below, the secret key 143 and the public key 144 are referred to as a common key for communication. That is, the common key for communication functions as the secret key 143 and the public key 144.

The encryption unit 12 encrypts the target data 141 that is stored without being encrypted in the storage 14, and transmits the encryption target data to the transmission unit 13.

In the present embodiment, the encryption unit 12 encrypts the target data 141 by using the public key 144 stored in the storage 14. The transmission unit 13 transmits the encrypted target data 141 (encryption target data) of the inference process to the server 20. In the meantime, when the common key for communication is used instead of the secret key 143 and the public key 111, the encryption unit 12 encrypts the target data 141 by using the common key for communication stored in the storage 14.

The reception unit 17 receives the encrypted process result 142 from the server 20 and transfers the same to the decryption unit 16. The decryption unit 16 decrypts the encrypted process result 142 received from the reception unit 17, and stores the decrypted process result 142 in the storage 14. In the present embodiment, the decryption unit 16 decrypts the encrypted process result 142 by using the secret key 143 stored in the storage 14. In the meantime, when the common key for communication is used instead of the secret key 143 and the public key 144, the decryption unit 16 decrypts the encrypted process result 142 by using the common key for communication stored in the storage 14.

The display unit 11 displays a variety of information, based on the process result 142 stored in the storage 14. The display unit 11 may display the process result 142, as it is, or may execute a predetermined process on the process result 142, and display a result of the execution.

The key sharing unit 15 executes a process (key sharing process) of sharing the secret key 143 and the public key 144 with the arithmetic apparatus 30 while keeping the keys confidential from an outside (except the client apparatus 10 and the arithmetic apparatus 30). That is, the key sharing unit 15 has a function of sharing the secret key 143 and the public key 144 between the client apparatus 10 and the arithmetic apparatus 30 without being known to the server 20.

Herein, the additive homomorphic encryption is described with reference to Paillier encryption, as an example.

When executing a process relating to encryption, a variety of settings as described below are determined. That is, prime numbers p and q that are safe for use in encryption are prepared. In the meantime, a sequence and precautions for determining the prime numbers may be the same as those of RSA encryption. Also, N=p×q. Also, k is arbitrarily set within a range of 1≤k≤N−1, g=1+kN. Herein, p and q are secret keys, and g and N are public keys and system parameters.

For example, when plaintext data is A and B (0≤A≤N−1, 0≤B≤N−1), encryption data $e_A$ and $e_B$ obtained by encrypting the plaintext data, respectively, are expressed, as shown in following equations (1) and (2).

$$e_A = g^A \times r_1^N \bmod N^2 \quad (1)$$

$$e_B = g^A r_2^N \bmod N^2 \quad (2)$$

here, $r_1$ (0≤$r_1$≤N−1) and $r_2$ (0≤$r_2$≤N−1) are random numbers.

For the encryption data in the Paillier encryption, it is possible to execute an arithmetic operation corresponding to a sum arithmetic operation between the plaintext data as a multiplication of the encryption data. The multiplication of the encryption data, i.e., $e_A \times e_B$ is expressed, as shown in an equation (3).

$$e_A \times e_B = g^A \times g^B \times r_1^N \times r_2^N \bmod N^2 \quad (A)$$
$$= g^{(A+B)} \times r_1^N \times r_2^N \bmod N^2$$

here, since g=(1+kN), $g^N$=(1+kN)$^N$ is obtained by substituting (1+kN) for a of $g^N$. Also, when (1+kN)$^N$ is expanded by the binomial theorem, (1+kN)$^N$=1+kN$^2$+ . . . . Since the second and subsequent terms of the equation 1+kN$^2$+ . . . after the expansion are all multiples of N$^2$, a result of dividing 1±kN$^2$+ . . . by N$^2$ is a remainder of 1. Therefore, $g^N \bmod N^2$=1. Since $g^N$=1, a relation of $g^{(A+B)}=g^{(A+B \bmod N)}$ is satisfied. Thus, the equation (A) can be changed by using the relation of $g^{(A+B)}=g^{(A+B \bmod N)}$, as follows.

$$\text{equation}(A) = g^{(A+B \bmod N)} \times r_1^N \times r_2^N \bmod N^2 \quad (B)$$
$$= g^{(A+B \bmod N)} \times (r_1 \times r_2)^N \bmod N^2$$

When $r_3 = r_1 \times r_2 \bmod N$, $r_3$ is also a random number because both $r_1$ and $r_2$ are random numbers. Therefore, the equation (B) can be changed, as follows.

$$\text{equation}(B) = g^{(A+B \bmod N)} \times r_3^N \bmod N^2 \quad (3)$$
$$= e(A + B \bmod N)$$

e(A+B mod N) in the equation (3) becomes (A+B mod N) when decrypted, Therefore, when A and. B are sufficiently smaller than N, (A+B mod N) can be regarded as (A+B). Therefore, it can be seen that multiplication of the encryption data corresponds to a sum arithmetic operation of the plaintext data.

Also, for the encryption data of the Paillier encryption, it is possible to execute an arithmetic operation corresponding to multiplication of the plaintext data and the integer number of the plaintext data.

A×C that is a multiplication of the plaintext data A and the integer number C corresponds to a sum arithmetic operation of adding AC times. Therefore, by performing the multiplication of the encryption data for each of the sum arithmetic operations, it is possible to execute an arithmetic operation corresponding to the multiplication of the plaintext data A and the integer number C for the encryption data.

Specifically, $e_A \times e_A \times \ldots$, i.e., a power of the encrypted data (integer number C power) may be performed, and a result thereof is as shown in an equation (4).

$$e_A \times e_A, \ldots = e_{AC} \text{ tm} \quad (4)$$

$e_{AC}$ in the equation (4) becomes AC when decrypted, and is a result of the multiplication of the plaintext data A and the integer number C. Therefore, it can be seen that an arithmetic operation of raising the same encryption data of the Paillier encryption is an arithmetic operation corresponding to a multiplication of the plaintext data and the integer number of the plaintext data.

Figure 3:
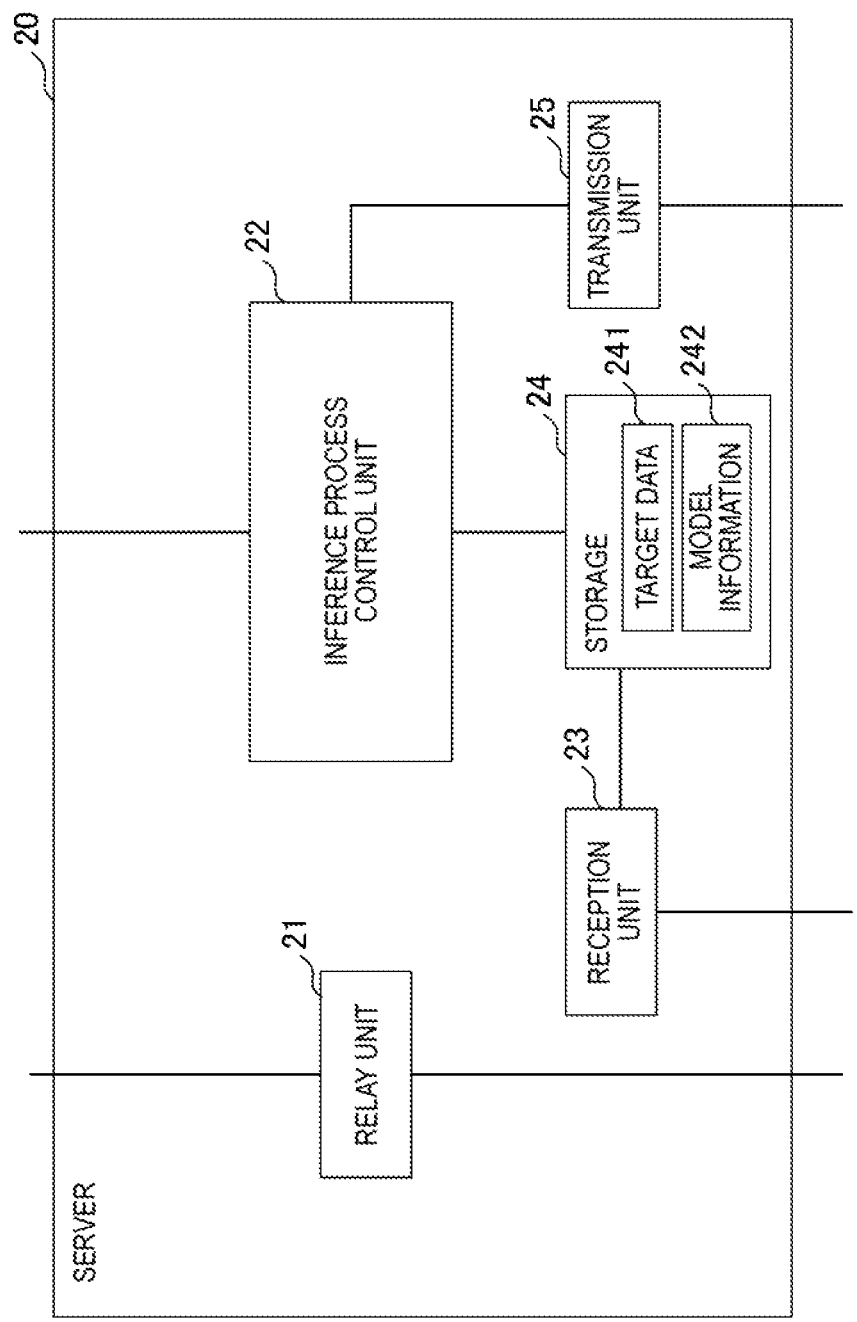
FIG. 3 is a functional configuration view of a sever in accordance with the embodiment.

FIG. 3 is a functional configuration view of the server in accordance with the embodiment.

The server 20 includes a relay unit 21, an inference process control unit 22, a reception unit 23, a storage 24, and a transmission unit 25. The inference process control unit 22 is an example of the arithmetic operation control unit.

The relay unit 21 relays communication in a key exchange process between the key sharing unit 15 of the client apparatus 10 and key sharing units 33 and 40 of the arithmetic apparatus 30, which will be described later.

The inference process control unit 22 executes an inference process using a neural network model by using encrypted target data 241 as it remains encrypted, in accordance with model information 242 stored in the storage 24. Then, the inference process control unit 22 transmits a process result 142 of the inference process in an encrypted state to the transmission unit 25. For example, the inference process control unit 22 executes a process of a processing layer in the neural network model in charge of the inference process control unit. The inference process control unit 22 controls the arithmetic apparatus 30 to execute a processing. layer in the neural network model in charge of the arithmetic apparatus 30. Herein, the processing layer in the neural network model in charge of the inference process control unit is a processing layer that can be executed in an encrypted data state. In the meantime, a configuration of the neural network model and an example of the processing layer will be described later.

The storage 24 stores encrypted target data 241 and model information 242 that includes information about a configuration of each processing layer of the neural network model, which is used in the inference process to be executed by the inference process control unit 22, and setting values to be used for each processing layer. The target data 241 is data of a target for which the inference process is executed. The setting values that are included in the model information 242 include, for example, a coefficient of a filter that is used in a convolution processing layer, a weight that is used in an affine layer, and the like. In the meantime, the setting values and the like that are used in each processing layer include values that are obtained by a learning using the neural network model.

The reception unit 23 receives the encrypted target data 141 transmitted from the client apparatus 10 and stores the same in the storage 24. The transmission unit 25 transmits the encrypted process result 142 obtained by the inference process control unit 22 to the client apparatus 10. The target data 241 is data including at least one of the encrypted target data 141, the encrypted arithmetic operation result obtained from the arithmetic apparatus 30, and the encrypted data processed in the information processing apparatus 20 in a state where it remains encrypted. Therefore, the inference process control unit 22 processes data, which includes at least one of the encrypted target data 141, the encrypted arithmetic operation result obtained from the arithmetic apparatus 30, and the encrypted data processed as it remains encrypted in the information processing apparatus 20, as the data remains encrypted.

Figure 4:
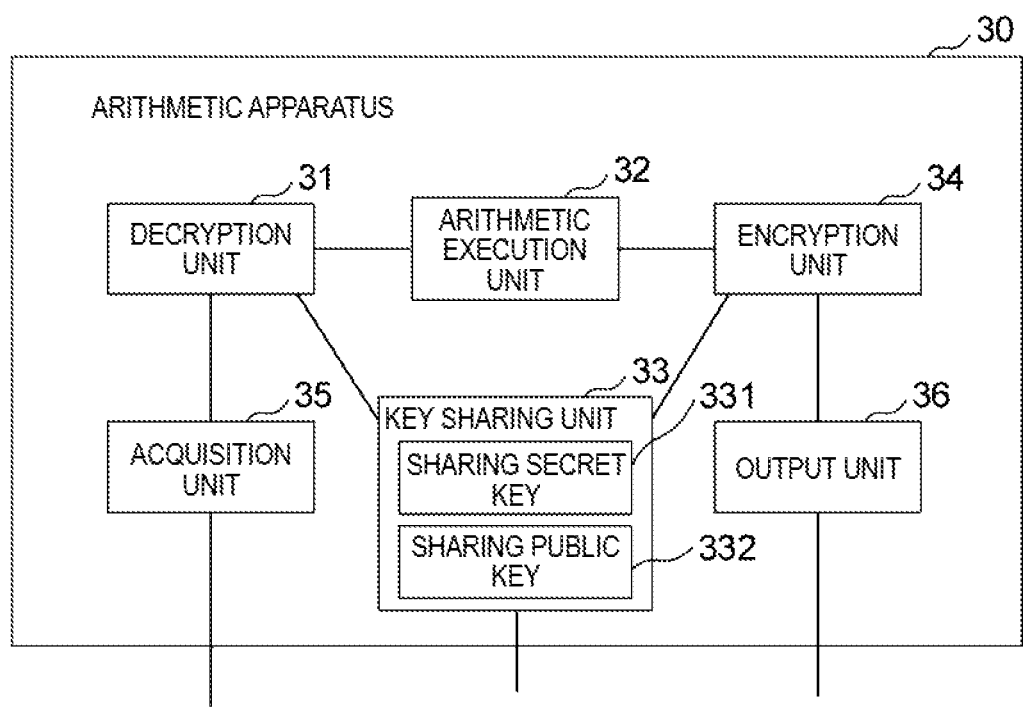
FIG. 4 is a functional configuration view of an arithmetic apparatus in accordance with the embodiment.

FIG. 4 is a functional configuration view of the arithmetic apparatus in accordance with the embodiment.

The arithmetic apparatus 30 is configured by a circuitry such as dedicated LSI (Large-Scale Integrated circuit), ASIC (Application Specific Integrated Circuit), FPGA (Field-Programmable Gate Array, and the like, for example. In the present embodiment, the arithmetic apparatus 30 is connected to an internal bus of the server 20. The arithmetic apparatus 30 includes a decryption unit 31, an arithmetic operation execution unit 32, a key sharing unit 33 including a storage (memory) in which diverse data is stored. an encryption unit 34, an acquisition unit 35, and an output unit 36. The arithmetic apparatus 30 is configured to output only encrypted data to an external apparatus (the server 20 and the like), for example. The arithmetic apparatus 30 is entirely or mostly configured by a hardware circuit that executes processes, and is adapted so that it is difficult (impossible or almost impossible) to cause an illegal operation such as illegally outputting data, fix example. Therefore, it is impossible or almost impossible to extract data, which is not encrypted yet during the process, from the arithmetic apparatus 30 through the server 20. In the meantime, the arithmetic apparatus 30 may output data that is at least partially encrypted to an external apparatus. The key sharing unit 33, the acquisition unit 35, and the output unit 36 may function as a connection unit that is communicatively connected to the server 20, for example. The connection unit is an example of the interface.

The key sharing unit 33 includes the storage. The key sharing unit 33 shares, with the client apparatus 10, a secret key for sharing 331 (second decryption key) and a public key for sharing 332 (second encryption key) that are used in a key sharing process with the client apparatus 10. The key sharing unit 33 stores, in the storage, the shared secret key for sharing 331 and public key for sharing 332. In the present embodiment, the secret key for sharing 331 is stored so that it cannot be read from an outside of the arithmetic apparatus 30. Herein, the state where reading is not possible from the outside may be caused due to a configuration of hardware. The secret key for sharing 331 may be stored in a hard-wired manner (connection logic manner), for example. In the meantime, the storage may be provided separately from the key sharing unit 33, in the arithmetic apparatus 30. In this case, the key sharing unit 33 may store the secret key for sharing 331 and public key for sharing 332 shared with the client apparatus 10 in the storage separately provided.

The key sharing unit 33 executes a process (key sharing process) of sharing the secret key 143 and the public key 144 with the client apparatus 10 while keeping the same confidential from the outside (except the client apparatus 10 and the arithmetic apparatus 30). Specifically, for example, the key sharing unit 33 transmits the public key for sharing 332 to the client apparatus 10, and acquires the secret key 143 and public key 141 encrypted by the public key for sharing 332 in the client apparatus 10, The key sharing unit 33 decrypts the secret key 143 and public key 144 encrypted by the public key for sharing 332 and thus acquires the secret key 143 and the public key 144. The key sharing unit 33 stores the acquired secret key 143 and public key 111 in the storage. According to the key sharing process, on the path between the client apparatus 10 and the arithmetic apparatus 30, the secret key 143 and the public key 144 are encrypted, so that a confidential state can be secured. Also, since the secret key for sharing 331 cannot be read from the outside of the arithmetic apparatus 30 and is not thus read and acquired from the server 20, the confidential state can be strictly maintained. In the meantime, in the case where the storage is provided in the arithmetic apparatus 30 separately from the key sharing unit 33, the key sharing unit 33 may store the secret key 143 and public key 144 shared with the client apparatus 10 in the storage provided separately.

Also, the key sharing unit 33 sets the acquired secret key 143 in the decryption unit 31 and sets the acquired public key 111 in the encryption unit 34. In the meantime, when using the common key for communication instead of the secret key 143 and the public key 144, the key sharing unit 33 sets the acquired common key for communication in the decryption unit 31 and the encryption unit 34.

The acquisition unit 35 acquires the encrypted data received from the server 20. Then, the decryption unit 31 decrypts the encrypted data transferred from the server 20 by the set secret key 143. That is, the decryption unit 31 decrypts the encrypted data acquired from the server 20 by the secret key 143 stored in the storage. The encrypted data transferred from the server 20 is an example of the encryption input data or encryption target data encrypted with the first encryption key.

In the meantime, the encrypted data transferred from the server 20 is encrypted data based on the encrypted target data transmitted from the client apparatus 10. That is, the encrypted data transferred from the server 20 is encrypted target data transmitted from the client apparatus 10, as it is, or encrypted data after any process has been performed on the encrypted target data. The decryption unit 31 transfers the decrypted data to the arithmetic operation execution unit 32. In the meantime, the acquisition unit 35 may receive the setting values that are used in processes from the server 20, together with the encrypted data, and may set or notify the received setting values in or to the arithmetic operation execution unit 32. In the meantime, when using the common key for communication, instead of the secret key 143 and the public key 144, the decryption unit 31 decrypts the encrypted data transferred from the server 20 by the common key for communication.

The arithmetic operation execution unit 32 executes a predetermined process on the decrypted data transferred from the decryption unit 31. The predetermined process is a process including a processing layer that cannot be executed in an encrypted data state in the neural network model. The arithmetic operation execution unit 32 transfers an arithmetic operation result to the encryption unit 34.

The encryption unit 34 encrypts the arithmetic operation result transferred from the arithmetic operation execution unit 32 with the set public key 144, and transfers the encrypted data to the inference process control unit 22 of the server 20. In this case, the encryption unit 34 may encrypt the data of the arithmetic operation result with the public key 144 stored in the storage. The data obtained by encrypting the arithmetic operation result is an example of the encrypted data of the arithmetic operation result. In the meantime, when using the common key for communication, instead of the secret key 143 and the public key 144, the encryption unit 34 encrypts the arithmetic operation result transferred from the arithmetic operation execution unit 32 with the set common key for communication, and transfers the encrypted data to the inference process control unit 22 of the server 20.

Subsequently, an example of the neural network model is described.

Figure 5:
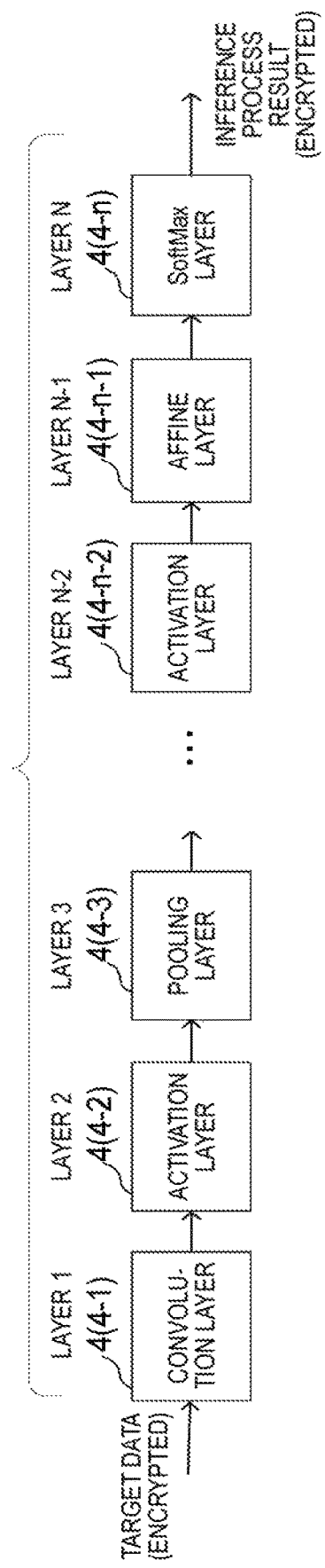
FIG. 5 is a configuration view of a neural network model in accordance with the embodiment.

FIG. 5 is a configuration view of the neural network model in accordance with the embodiment.

A neural network model 3 is a neural network model showing a configuration of the inference process that is executed by the inference process control unit 22, and is, for example, a model of a convolution neural network (CNN) for executing an inference process that infers what image data to be processed represents, for example, what a person, a dot, a cat or the like represents, and outputting a process result.

The neural network model 3 is configured by a plurality of processing layers 4. Specifically, the neural network model 3 includes a convolution layer 4-1, an activation layer 4-2, a pooling layer 4-3, an activation layer 4-$n$-2, an affine layer 4-$n$-1, a SoftMax layer 4-$n$, and the like. The convolution layer 4-1 executes a convolution process on image data. The activation layer 4-2 executes an activation process on data input from a pre-layer. The pooling layer 4-3 executes a down sampling process on data input from a pre-layer. The activation layer 4-$n$-2 executes an activation process on data input from a pre-layer. The affine layer 4-$n$-1 executes an affine conversion process on data input from a pre-layer. The SoftMax layer 4-$n$ executes a process on data input from a pre-layer by a SoftMax function. As the activation layer that executes the activation process, an activation layer that executes an activation process by a ReLU function (Rectified Linear Unit, Rectifier: rectified linear function) may be exemplified.

In the present embodiment, for the arithmetic operation process of the convolution layer 4-1, the process can be performed using data encrypted by the additive homomorphic encryption, as it is. Also, for the other layers 4, the processes cannot be, performed using the encrypted data as it is.

For the neural network model 3, the inference process control unit 22 causes any one of the server 20 and the arithmetic apparatus 30 to execute a processing layer that can be subjected to an arithmetic operation in an encrypted data state, in accordance with a preset setting. Also, the inference process control unit 22 causes the arithmetic apparatus 30 to execute a processing layer that cannot be subjected to an arithmetic operation in an encrypted data state. Therefore, the processing layer that can be subjected to an arithmetic operation in an encrypted data state can be all executed on the server 20-side, can be partially executed on the server 20-side, or can be all executed on the arithmetic apparatus 30-side, in accordance with the setting. In the meantime, in order to execute the processing layer on the arithmetic apparatus 30-side, for example, the arithmetic operation execution unit 32 of the arithmetic apparatus 30 is preferably provided with a circuit for executing all the processing layers 4 that are executed on the arithmetic apparatus 30-side. In this case, the setting values and the like that are used for the processing layers 4 may be fixedly set or may be transferred and set from the inference process control unit 22 to the arithmetic apparatus 30 when performing a process.

Subsequently, process operations that are executed in the computer system 1 are described.

Figure 6:
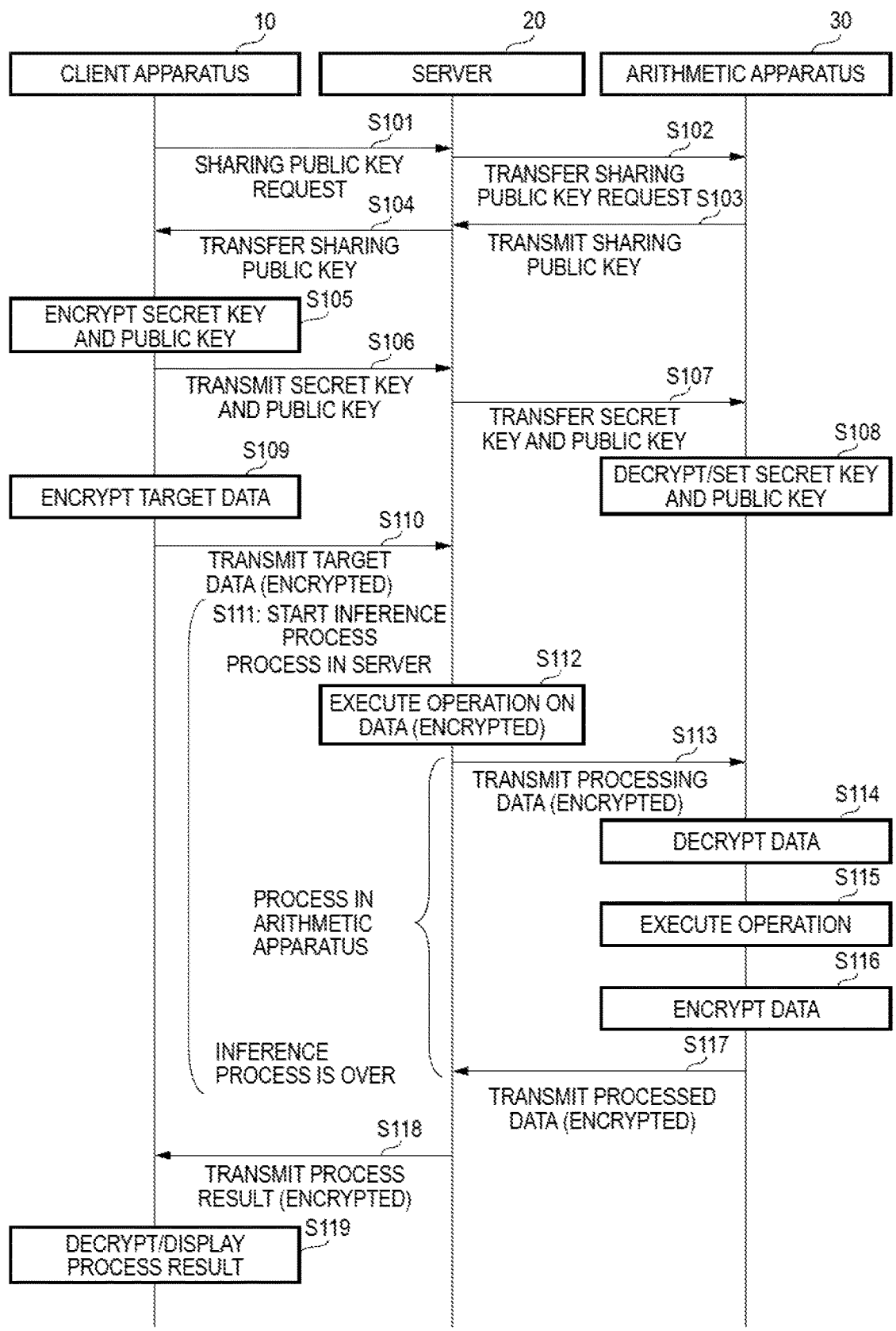
FIG. 6 is a sequence diagram showing process operations that are executed in the computer system in accordance with the embodiment.

FIG. 6 is a sequence diagram showing process operations that are executed in the computer system in accordance with the embodiment.

When the key sharing unit 15 of the client apparatus 10 receives a process instruction for predetermined target data from a user, the key sharing unit 15 transmits a request for a public key for sharing to the arithmetic apparatus 30 via the server 20 (steps S101 and S102). In response, the key sharing unit 33 of the arithmetic apparatus 30 transmits the public key for sharing 332 to the client apparatus 10 via the server 20 (steps S103 and S104).

The key sharing unit 15 of the client apparatus 10 receives the public key for sharing. 332, and encrypts the secret key 143 and the public key 141 by using the public key for sharing 332 (step S105). Then, the key sharing unit 15 of the client apparatus 10 transmits the encrypted secret key 143 and public key 144 to the arithmetic apparatus 30 via the server 20 (steps S106 and S107).

The key sharing unit 33 of the arithmetic apparatus 30 receives the encrypted secret key 143 and public key 144, decrypts the encrypted secret key 143 and public key 144 by using the secret key for sharing 331 and obtains the secret key 143 and the public key 144. Then, the key sharing unit 33 sets the secret key 143 in the decryption unit 31, and sets the public key 144 in the encryption unit 34 (step S108). By steps S101 to S108, the secret key 143 and the public key 144 are shared between the client apparatus 10 and the arithmetic apparatus 30 while keeping the keys confidential from an outside.

Subsequently, the encryption unit 12 of the client apparatus 10 encrypts the target data 141 by using the public key 144, and transfers the same to the transmission unit 13 (step S109). Then, the transmission unit 13 transmits the encrypted target data to the server 20 (step S110).

In the server 20 the reception unit 23 receives and stores the encrypted target data in the storage 24. Then, the inference process control unit 22 starts an inference process on the target data (step S111).

In this inference process, for a process of a layer that is executed by the server 20, the inference process control unit 22 executes an arithmetic operation by using the encrypted data as it is (step S112).

On the other hand, for processes of one or more processing layers that are executed on the arithmetic apparatus 30-side, the inference process control unit 22 transmits encrypted processing data, i.e., the encrypted target data or data of a process result by a previous layer to the arithmetic apparatus 30 (step S113). In the arithmetic apparatus 30, when the encrypted processing data is received, the decryption unit 31 decrypts the processing data by using the secret key 143 and transfers the same to the arithmetic operation execution unit 172. The arithmetic operation execution unit 32 executes a predetermined arithmetic operation on the decrypted processing data, and transfers data after the arithmetic operation process to the encryption unit 34 (step S115). The encryption unit 34 encrypts the data after the arithmetic operation process by using the public key 144 (step S116), and transmits the encrypted data after the arithmetic operation process to the server 20 (step S117).

The processing of all layers that execute the inference process in this way is executed, so that the inference process is over and an encrypted process result is obtained.

When the inference process is over, the inference process control unit 22 of the server 20 transfers the encrypted process result to the transmission unit 25. Then, the transmission unit 25 transmits the encrypted process result to the client apparatus 10 (step S118).

In the client apparatus 10, the reception unit 17 receives and transfers the encrypted process result to the decimation unit 16. Also, the decryption unit 16 decrypts the received encrypted process result by the secret key 143 and stores the same in the storage 14. Then, the display unit 11 displays information, based on the process result (step S119).

As described above, in the process of the computer system 1, since the server 20 processes the data as it is encrypted, it is possible to prevent the data from being leaked. Also, in the arithmetic apparatus 30, the data is decrypted and processed. However, since it is not possible to extract data in the arithmetic apparatus 30, which is not encrypted, from the server 20, it is possible to prevent the data from being leaked.

The client apparatus 10 and the server 20 can be respectively configured by a computer apparatus.

Figure 7:
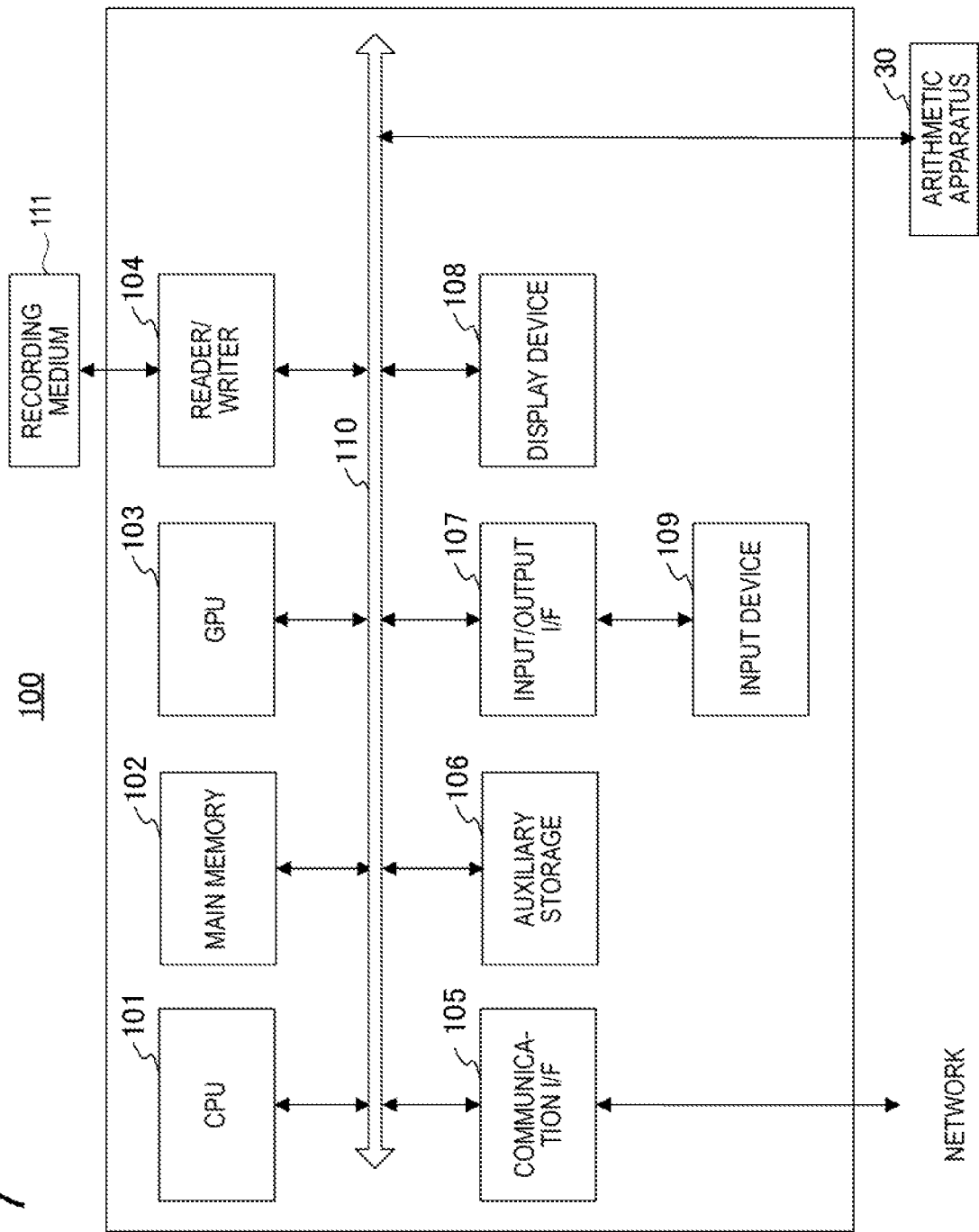
FIG. 7 is a configuration view of a computer apparatus in accordance with the embodiment.

FIG. 7 is a configuration view of a computer apparatus in accordance with the embodiment. In the meantime, in the present embodiment, the client apparatus 10 and the server 20 are configured as separate computer apparatuses. However, the computer apparatuses may have similar configurations, except some configurations. Therefore, in descriptions below, for convenience, the computer apparatus configuring each of the client apparatus 10 and the server 20 is described using the computer apparatus shown in FIG. 7, A computer apparatus 100 includes, for example, a CPU (Central Processing Unit) 101 (processor). a main memory 102, a GPU (Graphics Processing Unit) 103, a reader/writer 104, a communication interface (communication I.T) 105, an auxiliary storage 106, an input/output interface (input/output FP) 107, a display device 108, and an input device 109. The CPU 101. the main memory 102. the GPU 103, the reader writer 104, the communication I/P 105, the auxiliary storage 106, the input/output I/F 107, and the display device 108 are connected each other via a bus 110. The client apparatus 10; 10A and the server 20 are respectively configured by appropriately selecting some or all of the constitutional elements of the computer apparatus 100. In the present embodiment, the arithmetic apparatus 30 is connected to the computer apparatus 100 configuring the server 20, via the bus 110. In the meantime, the arithmetic apparatus 30; 30A; 30B may be configured by appropriately selecting some or all of the constitutional elements of the computer apparatus 100. Also, the CPU 101 may be, for example, other types of processors such as ASIC and FPGA. The client apparatus 10A and the arithmetic apparatus 30A; 30B will be described later.

At least one of the main memory 102 and the auxiliary storage 106 functions as the storage 14 of the client apparatus 10 and the storage 24 of the server 20. Also, at least one of the main memory 102 and the auxiliary storage 106 may function as the storage of the arithmetic apparatus 30 30A. Also, at least one of the main memory 102 and the auxiliary storage 106 may function as a storage 60B of the client apparatus 10A, Which will be described later. Also, at least one of the main memory 102 and the auxiliary storage 106 may function as a storage 70B of the arithmetic apparatus 30B which will be described later The main memory 102 or the auxiliary storage 106 is an example of the memory.

In the client apparatus 10; 10A, the CPU 101 may function as the display unit 11, the encryption unit 12, the key sharing unit 15, the decryption unit 16, and a control unit 60A of a key sharing unit 60 (which will be described later), for example, by executing a process program stored in the auxiliary storage 106. Also, in the server 20, the CPU 101 may function as the inference process control unit 22, for example, by executing a process program stored in the auxiliary storage 106. Also, in the arithmetic apparatus 30; 30A; 30B, the CPU 101 may function as the decryption unit 31, the arithmetic operation execution unit 32, the key sharing unit 33, the encryption unit 34, and a control unit 70A of a key sharing unit 70 (which will be described later), for example. In the meantime, in the server 20, the CPU 101 may have higher processing performance than the CPU 101 of the computer apparatus 100 configuring the client apparatus 10; 10A.

The main memory 102 is, for example, a RAM, a ROM and the like, and stores programs (a process program and the like) that are executed by the CPU 101. and a variety of information. The auxiliary storage device 106 is, for example, a non-transitory computer-readable recording medium (non-volatile storage device) such as HDD (Hard DISK Drive), SSD (Solid State Drive) and the like, and stores programs that are executed by the CPU 101, and a variety of information. In the computer apparatus 100 configuring the client apparatus 10, the main memory 102 stores, for example, the target data 141, the process result 142, the secret key 143, the public key 144 and the like. In the computer apparatus 100 configuring the server 20, the main memory 102 stores, for example, the target data 241, the model information 242 and the like. hi the computer apparatus 100 configuring the arithmetic apparatus 30; 30A; 30B, the main memory 102 stores, for example, the secret key 143, the public key 144, the common key for communication, the secret key for sharing 331, the public key for sharing 332, a common key for sharing and the like. The common key for communication and the common key for sharing will be described later.

The GPU 103 is a processor that is suitable for execution of specific processing such as image processing, for example, and is suitable for execution of processing that is executed in parallel, for example. In the present embodiment, the GPU 103 executes predetermined processing in accordance with an instruction of the CPU 101.

The reader/writer 104 can detachably mount the recording medium 111, reads data from the recording medium 111, and wires data to the recording medium 111. The recording medium 111 includes, for example, a non-transitory computer-readable recording medium (non-volatile recording medium) such as an SD memory card, an FD (floppy disk: registered trademark), a CD, a DVD, a BD (registered trademark), a flash memory and the like. In the present embodiment, the process programs may be stored in the recording medium 111, and may be read and used by the reader/writer 104. Also, the computer apparatus 100 configuring the client apparatus 10 reads the target data 141 from the recording medium 111 in which the target data 141 is stored by using the reader/writer 104. The computer apparatus 100 configuring the client apparatus 10 may store the read target data 141 in the storage 14.

The communication I/F 105 is connected to the network 40, and transmits and receives data to and from other devices connected to the network 40. The transmission unit 13, the reception unit 17 and the key sharing unit 15 of the client apparatus 10, and the reception unit 23, the transmission unit 25 and the relay unit 21 of the server 20 are configured by the communication I/F 105 and the CPU 101 of the computer apparatus 100 configuring each of the client apparatus and the server. The communication I/F 105 may function as an interface of the key sharing unit 33; 60, the acquisition unit 35, the output unit 36 and the like in the arithmetic apparatus 30; 30A; 30B. The key sharing unit 60 will be described later.

The input/output I/F 107 is connected to the input device 109 such as a mouse, a keyboard and the like, for example. In the computer apparatus 100 configuring the client apparatus 10, the input/output I/F 107 receives a user's operation input of the client apparatus 10 made using the input device 109. Also, in the computer apparatus 100 configuring the server 20, the input/output I/F 107 receives an administrator's operation input of the server 20 made using the input device 109. The input/output I/F 107 may function as an interface of the key sharing unit 33; 60, the acquisition unit 35, the output unit 36 and the like in the arithmetic apparatus 30; 30A; 30B.

The display device 108 is, for example, a display device such as a liquid crystal monitor and the like, and displays and outputs a variety of information. The display device 18 functions, for example, as the display unit 11 in the client apparatus 10.

Subsequently, computer systems of modified embodiments are described.

A first modified embodiment is described with reference to FIG. 8.

Figure 8:
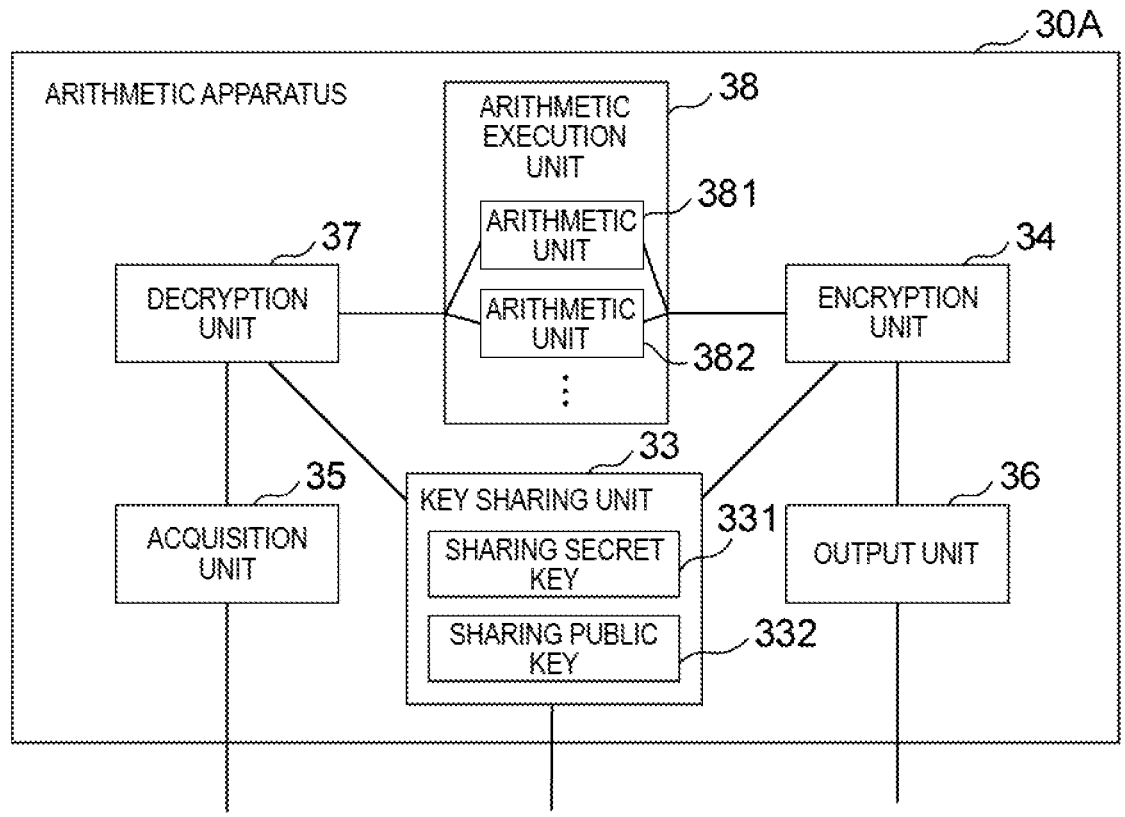
FIG. 8 is a functional configuration view of an arithmetic apparatus in accordance with a first modified embodiment.

FIG. 8 is a functional configuration view of an arithmetic apparatus in accordance with a first modified embodiment. In the meantime, the similar configurations to the arithmetic apparatus 30 of the embodiment are denoted with the same reference signs, and the overlapping descriptions thereof are omitted.

An arithmetic apparatus 30A of the first modified embodiment includes an arithmetic operation execution unit 38, instead of the arithmetic operation execution unit 32 in the arithmetic apparatus 30, and also includes a decryption unit 37, instead of the decryption unit 31.

The decryption unit 37 receives a. designation of a type of an arithmetic operation to be executed through the acquisition unit 35 from the inference process control unit 22 and transfers the same to the arithmetic. operation execution unit 38, in addition to the function of the decryption unit 31. In the meantime, the designation of the processing layer may be a designation of a plurality of processing layers.

The arithmetic operation execution unit 38 includes a plurality of arithmetic operation units 381, 382 and the like each of which is configured by a hardware circuit for executing a process corresponding to the processing layer 4. The arithmetic operation execution unit 38 selects the arithmetic operation unit 381 that executes a process corresponding to the designation of the type of the arithmetic operation transferred from the decryption unit 37, and inputs the data transferred from the decryption unit 37 to the selected arithmetic operation unit. In the meantime, when a designation of a plurality of types of arithmetic operations is received from the decryption unit 37, the arithmetic operation execution unit 38 sequentially selects the arithmetic operation units corresponding to the designation, and inputs data of a process result by the arithmetic operation unit that executes a previous processing layer to the arithmetic operation unit that executes a next processing layer. The arithmetic operation units 381, 382 and the like are an example of a plurality of circuits that executes different arithmetic operations.

In the meantime, in a case where the arithmetic apparatus 30A of the first modified embodiment is used, the inference process control unit 22 of the server 20 has a function of, when causing the arithmetic operation process 30A to execute a process of a processing layer, transmitting a designation of a type of an arithmetic operation corresponding to the processing layer to the arithmetic apparatus 30A. Also, instead of designating the type of the arithmetic operation, a processing layer may be designated. In this case, the arithmetic operation execution unit 38 selects the arithmetic operation unit that executes a process corresponding to the designation of the processing layer.

That is, the server 20 transmits, to the arithmetic apparatus 30A, an instruction of an arithmetic operation that is executed for the encrypted data transferred from the server 20. Also, the arithmetic apparatus 30A decrypts the received encrypted data. Then, the arithmetic apparatus 30A selects an arithmetic operation unit that executes an arithmetic operation corresponding to the instruction of an arithmetic operation, and executes an arithmetic operation on the decrypted data by the selected arithmetic operation unit.

A second modified embodiment is described with reference to FIGS. 9 to 11.

In the second modified embodiment, the secret key 143 and the public key 144 are shared between a client apparatus 10A and an arithmetic apparatus 30B by using a common key for sharing, instead of the secret key for sharing 331 and the public key for sharing 332. That is, in the second modified embodiment, the client apparatus 10A and the arithmetic apparatus 30B store the common key for sharing, respectively. The client apparatus 10A encrypts the secret key 143 and the public key 144 by using the common key for sharing, and transmits the encrypted secret key 143 and public key 144 to the arithmetic apparatus 30B. The arithmetic apparatus 30B receives the encrypted secret key 143 and public key 144, and decrypts the encrypted secret key 143 and public key 144 by using the common key for sharing. Thereby, the client apparatus 10A and the arithmetic apparatus 30B share the secret key 143 and the public key 144.

In the meantime, in the second modified embodiment. the common key for communication may be used instead of the secret key 143 and the public key 144. That is, the client apparatus 10A encrypts the common key for communication by using the common key for sharing, and transmits the encrypted common key for communication to the arithmetic apparatus 30B. The arithmetic apparatus 30B receives the encrypted common key for communication, and decrypts the encrypted common key for communication by using the common key for sharing. h this case, in descriptions below, the secret key 143 and the public key 144 are also called a common key for communication.

The second modified embodiment is characterized by a method of sharing the common key for sharing between the client apparatus 10A and the arithmetic apparatus 30B while keeping the key confidential from the outside. In descriptions below, the characteristic method of the second modified embodiment of sharing the common key for sharing between the client apparatus 10A and the arithmetic apparatus 30B is described. In the meantime, regarding the client apparatus 10A and the arithmetic apparatus 30B, the similar configurations to the client apparatus 10 and the arithmetic apparatus 30 of the embodiment are denoted with the same reference signs, and the overlapping descriptions thereof are omitted.

Figure 9:
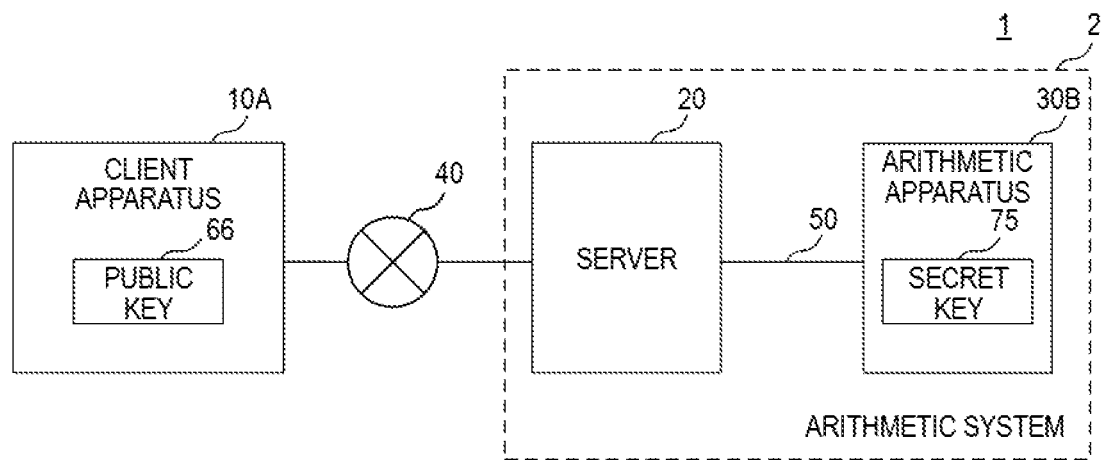
FIG. 9 is an overall configuration view of a computer system in accordance with a second modified embodiment.

FIG. 9 is an overall configuration view of a computer system in accordance with the second modified embodiment.

The client apparatus 10A stores a public key 66. Also, the arithmetic apparatus 30B stores a secret key 75. In the meantime, in the second modified embodiment, since the arithmetic apparatus 30B shares the secret key 143 and the public key 144 with the client apparatus 10A by using a common key for sharing that is prepared by a process to be described later, the arithmetic apparatus 30B does not need to store the secret key for sharing 331 and the public key for sharing 332.

Figure 10:
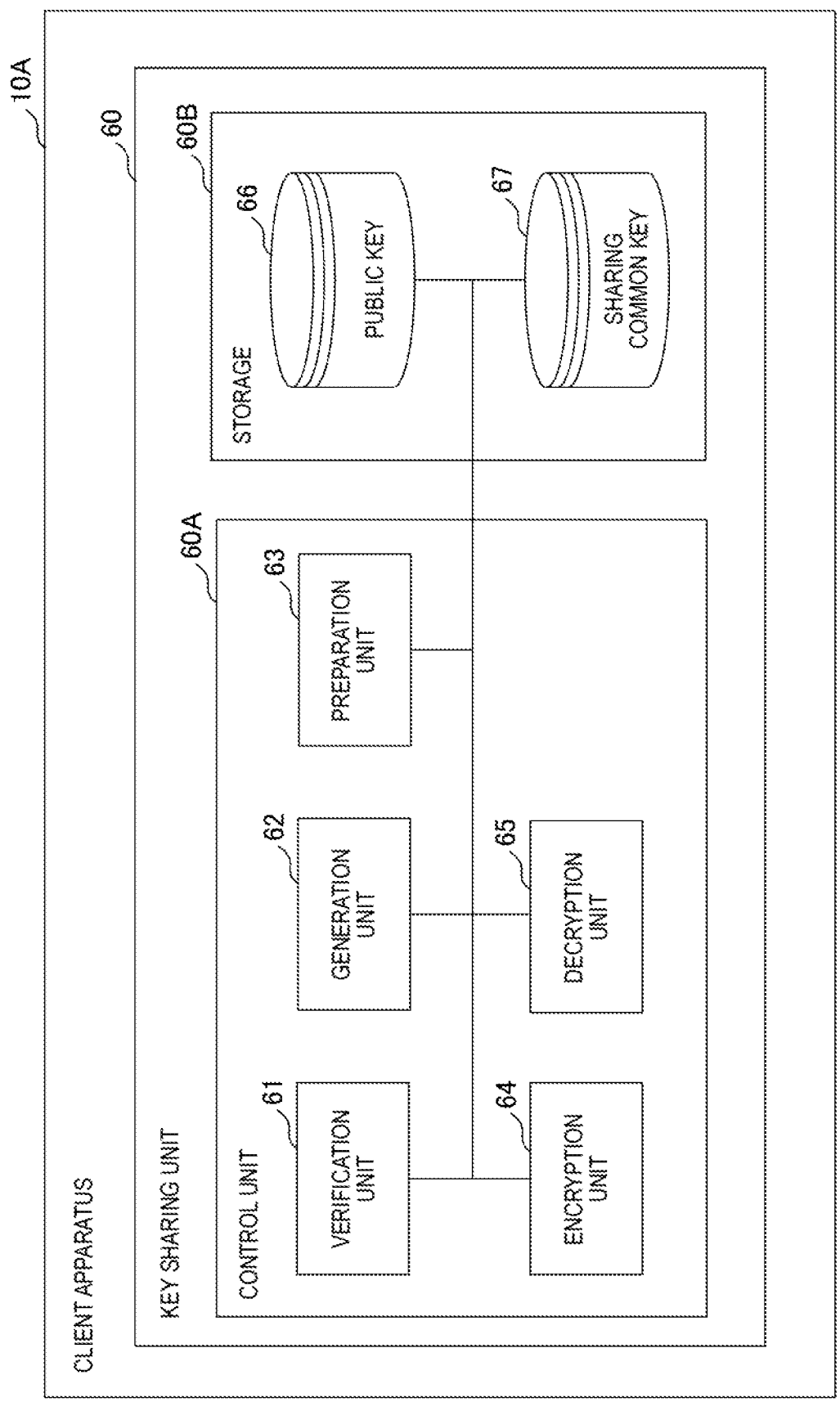
FIG. 10 is a functional configuration view of a key Sharing unit of a client apparatus in accordance with the second modified embodiment.

FIG. 10 is a functional configuration view of a key sharing unit of a client apparatus in accordance with the second modified embodiment, A key sharing unit 60 provided to the client apparatus 10A in accordance with the second modified embodiment is described with reference to FIG. 10. In the meantime, the similar configurations to the client apparatus 10 of the embodiment are not shown.

The client apparatus 10A includes a key sharing unit 60, instead of the key sharing unit 15 of the client apparatus 10.

The key sharing unit 60 includes a control unit 60A and a storage 60B. The control unit 60A includes a. verification unit 61, a generation unit 62, a preparation unit 63. an encryption unit 64, and a decryption unit 65. Also, the storage 60B stores a public key 66, and a common key for sharing 67. In the meantime, the common key for sharing 67 is stored as a result of a key sharing process with the arithmetic apparatus 30B.

The public key 66 is a public key corresponding to the secret key 75 stored in the arithmetic apparatus 30B. The public key 66 is distributed to a client who is a user of the arithmetic apparatus 30B, when developers including a developer and a manufacturer of the arithmetic apparatus 30B store the secret key 75 in the arithmetic apparatus 30B, for example. The public key 66 may be distributed with being embedded in a DLL (Dynamic Link Library) that is called when an application to execute the inference process is activated in the client apparatus 10A, for example. In the meantime, the public key 66 may also he a decryption key corresponding to the secret key 75.

The common key for sharing 67 is a key that is shared with the arithmetic apparatus 30B with being kept confidential from the outside by executing key sharing, and functions as the secret key for sharing 331 and the public key for sharing 332 of the embodiment.

Figure 11:
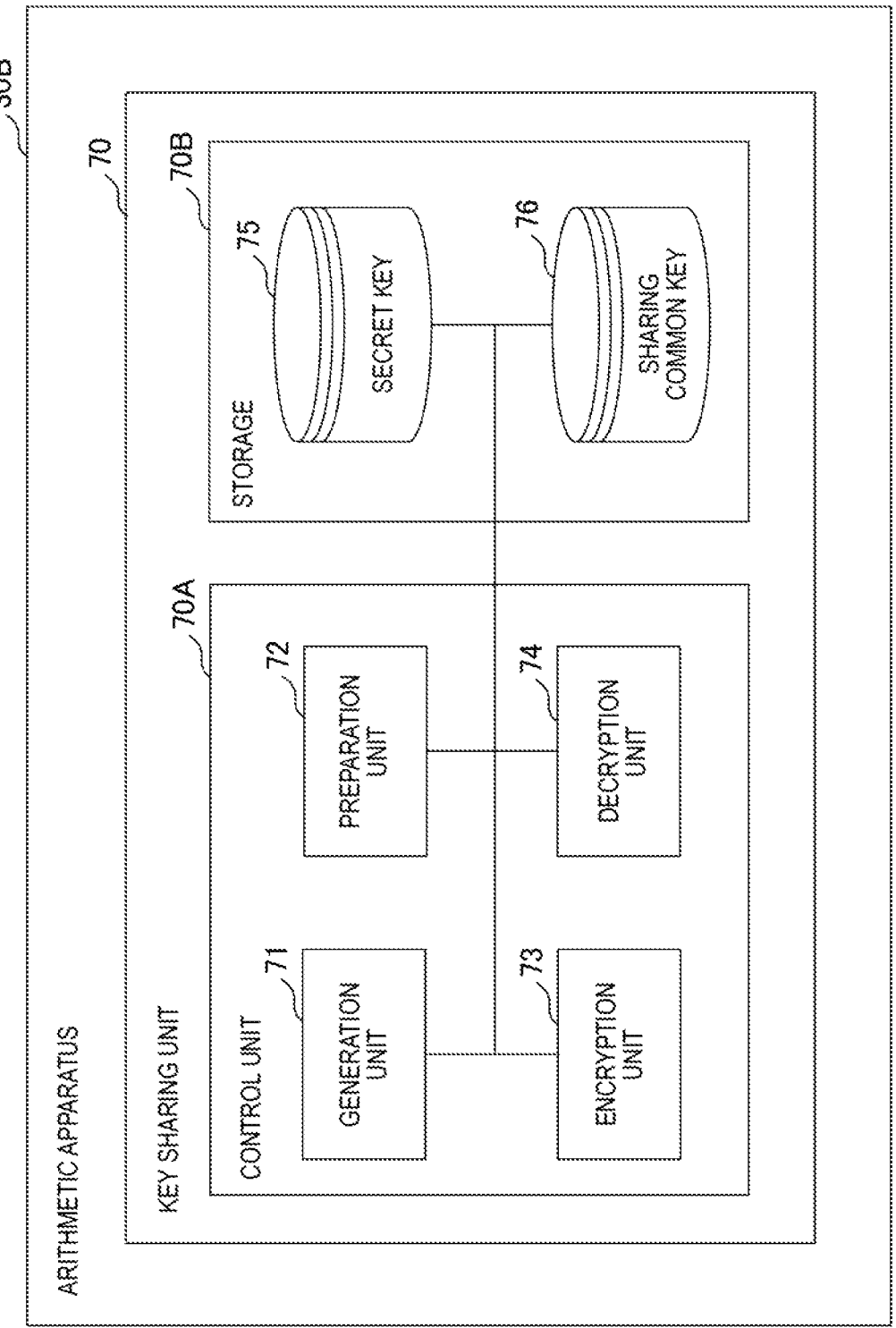
FIG. 11 is a functional configuration view of a key sharing unit of an arithmetic apparatus in accordance with the second modified embodiment.

FIG. 11 is a functional configuration view of a key sharing unit of the arithmetic apparatus in accordance with the second modified embodiment.

A key sharing unit 70 of the arithmetic apparatus 30B in accordance with the second modified embodiment is described with reference to FIG. 11. In the meantime, the similar configurations to the arithmetic apparatus 30 of the embodiment are not shown.

The arithmetic apparatus 30B includes a key sharing unit 70, instead of the key sharing unit 33 of the arithmetic apparatus 30.

The key sharing unit 70 includes a control unit 70A and a storage 70B. The control unit 70A includes a generation unit 71, a preparation unit 72, an encryption unit 73, and a decryption unit 74. Also, the storage 70B stores a secret key 75, and a common key for sharing 76. In the meantime, the common key for sharing 76 is stored as a result of the key sharing process with the client apparatus 10A.

The secret key 75 is stored in the storage 70B so that it cannot be read from an outside of the arithmetic apparatus 30B. The secret key 75 may be determined by developers including a developer and a manufacturer of the arithmetic apparatus 30B and may be stored in the storage 70B by using a storing method having a tamper-resistance such as a hard-wired manner when manufacturing the arithmetic apparatus 30B. The common key for sharing 76 is a key that is shared with the client apparatus 10A with being kept confidential from the outside by executing key sharing, and functions as the secret key for sharing 331 and the public key for sharing 332 of the embodiment. That is, the common key for sharing 67 that is stored in the client apparatus 10A and the common key for sharing 76 that is stored in the arithmetic apparatus 30B are the same value.

A key sharing process of the common key for sharing that is executed between the client apparatus 10A and the arithmetic apparatus 30B is described with reference to FIGS. 2 to 4, 10 and 11. In descriptions below, it is assumed that the client apparatus 10A and the arithmetic apparatus 30B share a variety of parameters defining a. finite cyclic group, a hash function and the like.

In the arithmetic apparatus 30B, the generation unit 71 generates a random temporary key a. The temporary key a is a value randomly selected from integer numbers. The preparation unit 72 prepares a public key aG by using the temporary key a and a generator G, as an element of a finite cyclic group in which a discrete logarithm problem is difficult. The generator G is a base point G of an elliptic curve group, for example. In descriptions below, it is assumed that the finite cyclic group is an elliptic curve group. In the meantime, in a case where the finite cyclic group is a finite field multiplicative group, a generator of the finite cyclic group is a generator g, and a public key $g^a$ mod n is prepared. n is a prime number. The temporary key a is an example of the first integer number. Also, the public key aG is an example of the first public key.

The preparation unit 72 applies a hash function H to the public key aG to obtain a hash value H(aG). Also, the preparation unit 72 prepares an electronic signature s by using the hash value H(aG) and the secret key 75. The electronic signature s is, for example, a value obtained by encrypting the hash value H(aG) with the secret key 75. In the meantime, in the case where the finite cyclic group is the finite field multiplicative group, the hash value is H($g^a$ mod n).

The output unit 36 transmits the public key aG and the electronic signature s to the client apparatus 10A through the server 20. Specifically, the output unit 36 outputs the public key aG and the electronic signature s to the server 20, and the relay unit 21 of the server 20 transmits the public key aG and the electronic signature s to the client apparatus 10A.

In the client apparatus 10A, the reception unit 17 receives the public key aG and the electronic signature s. The verification unit 61 applies the hash function to the public key aG to obtain the hash value H(aG). Then, the verification unit 61 verifies a signature by using the hash value H(aG), the electronic signature s and the public key 66.

An example of the signature verification using the electronic signature s is described. The verification unit 61 applies the hash function H to the public key aG. Also, the verification unit 61 decrypts the electronic signature s with the public key 66. Then, the verification unit 61 confirms validity of the public key Ag when a value obtained by applying the hash function H to the public key aG and a value obtained by decrypting the electronic signature s are the same. When the public key aG is valid, it guarantees that the public key aG is prepared by the arithmetic apparatus 30B possessing the secret key 75. In the meantime, for the signature verification, a signature algorithm such as RSA, DSA (Digital Signature Algorithm). ECDSA (Elliptic Curve Digital Signature Algorithm) or the like may be used.

The generation unit 62 generates a temporary key b when the validity of the public key aG is confirmed by the electronic signature s. The temporary key b is a value randomly selected from integer numbers. The preparation unit 63 prepares a public key bG by using the temporary key b and the generator G, as an element of the finite cyclic group in which the discrete logarithm problem is difficult. In the meantime, in a case where the finite cyclic group is a finite field multiplicative group, a generator of the finite cyclic group is a generator g, and a public key $g^b$ mod n is prepared. The temporary key b is an example of the second integer number. Also, the public key bG is an example of the second public key.

Additionally, the preparation unit 63 applies the hash function H to a value obtained by multiplying the temporary key h and the public key aG, thereby preparing H(b×aG) as the common key for sharing 67. In the meantime, in the case where the finite cyclic group is a finite field multiplicative group, H((g$^a$ mod n)$^b$ mod n)) is prepared as the common key for sharing 67. Also, the common key for sharing 67 may be simply b×aG.

The transmission unit 13 transmits the public key bG to the arithmetic apparatus 30B. Specifically, the transmission unit 13 transmits the public key bG to the server 20, and the relay unit 21 of the server 20 inputs the public key bG to the arithmetic apparatus 30B.

In the arithmetic apparatus 30B, the acquisition unit 35 acquires the public key bG. That is, the acquisition unit 35 acquires the public key bG prepared in the client apparatus 10A when the validity of the public key aG is confirmed by the electronic signature s in the client apparatus 10A.

Then, the preparation unit 72 applies the hash function H to the temporary key a and the public key bG to prepare H(a×bG) as the common key for sharing 76. In the meantime, in a case where the finite cyclic group is a finite field multiplicative group, H((g$^b$ mod n)$^3$ mod n)) is prepared as the common key for sharing 76. Also, the common key for sharing 76 may be simply a×bG.

By the above processes, the client apparatus 10A and the arithmetic apparatus 30B share the common key for sharing while keeping the same confidential from the outside. That is, even if the server 20 and the other apparatuses acquire the public key aG and the public key bG, it is difficult to solve the discrete logarithm problem with the public key aG and the public key bG so that it is not possible to obtain the temporary key a and the temporary key b from the public key aG and the public key bG. Also, even if the server 20 and the other apparatuses acquire the electronic signature s, it is not possible to obtain the temporary key a and the temporary key b from the electronic signature s. Therefore, since the server 20 and the other apparatuses that cannot obtain the temporary key a and the temporary key b cannot obtain a×bG and b×aG, it is impossible to acquire the common key for sharing.

Also, the server 20 and the other apparatuses generate a temporary key a', replace the public key aG with another value a'G and transmit the same to the client apparatus 10A. Also, the server 20 and the other apparatuses acquire the public key bG from the client apparatus 10A and prepare an unauthorized common key for sharing a'×bG. Thereby, an unauthorized operation where the server 20 and the other apparatuses share the unauthorized common key for sharing a'×bG with the client apparatus 10A is considered.

Even in this case, since the server 20 and the other apparatuses have no secret key 75, they cannot prepare an electronic signature s' corresponding to another value a'G. Thus, since the client apparatus 10A cannot confirm that another value a'G is valid, the client apparatus 10A does not transmit the public key bG to the server 20 and does not prepare the unauthorized common key for sharing a'×bG, as valid. Therefore, the server 20 and the other apparatuses cannot decrypt the encrypted data transmitted from the client apparatus 10A by using the unauthorized common key for sharing a'×bG.

By the above, the client apparatus 10A and the arithmetic apparatus 30B in accordance with the second modified embodiment can share the common key for sharing without performing a complicated process such as DH-EKE in which a complicated arithmetic operation and a plurality of communications are caused, as a process for preventing a man-in-the-middle attack on the server 20 and the other apparatuses.

A process of sharing the secret key 143 and the public key 144 after sharing the common key for sharing is described. In the meantime, in descriptions below, when the common key for communication is used instead of the secret key 143 and the public key 144, the secret key 143 and the public key 144 are also referred to as the common key for communication.

In the client apparatus 10A, the encryption unit 64 encrypts the secret key 143 and the public key 144 by using the common key for sharing 67. The transmission unit 13 transmits the encrypted secret key 143 and public key 144 to the arithmetic apparatus 30B.

Specifically, the transmission unit 13 transmits the encrypted secret key 143 and public key 144 to the server 20, and the relay unit 21 of the server 20 inputs the encrypted secret key 143 and public key 144 to the arithmetic apparatus 30B.

In the arithmetic apparatus 30B, the acquisition unit 35 acquires the encrypted secret key 143 and public key 144. Then, the decryption unit 74 decrypts the encrypted secret key 143 and public key 144 by using the common key for sharing 76. Thereby, the client apparatus 10A and the arithmetic apparatus 30B share the secret key 143 and the public key 144.

In the meantime, when sharing the secret key 143 and the public key 144 by transmitting the secret key 143 and the public key 144 from the arithmetic apparatus 30B to the client apparatus 10A, a following process is executed.

In the arithmetic apparatus 30B, the encryption unit 73 encrypts the secret key 143 and the public key 144 by using the common key for sharing 76. The output unit 36 transmits the encrypted secret key 143 and public key 144 to the client apparatus IDA via the server 20. Specifically, the output unit 36 outputs the encrypted secret key 143 and public key 144 to the server 20, and the relay unit 21 of the server 20 transmits the encrypted secret key 143 and public key 144 to the client apparatus 10A.

In the client apparatus 10A, the reception unit 17 receives the encrypted secret key 143 and public key 144. The decryption unit 65 decrypts the encrypted secret key 143 and public key 144 by using the common key for sharing 67. Thereby, the client apparatus 10A and the arithmetic apparatus 30B share the secret key 143 and the public key 144.

In the descriptions above, for simple descriptions, the encryption unit 64 and the decryption unit 65 have been described as being separately provided from the encryption unit 12 and the decryption unit 16. However, the encryption unit 12 and the decryption unit 16 may function as the encryption unit 64 and the decryption unit 65, respectively. Also, the encryption unit 73 and the decryption unit 74 have been described as being separately provided from the encryption unit 34 and the decryption unit 31. However, the encryption unit 34 and the decryption unit 31 may function as the encryption unit 73 and the decryption unit 74, respectively.

In many cases, there is no problem with the method of the second modified embodiment. However, if the secret key 75 is distributed with being written to all devices, it is necessary to take measures such as imparting the tamper-resistance to the storage 70B, and the secret key 75 may not be safely stored. In this case, the developers may determine the temporary key a for each arithmetic apparatus 30B, obtain the electronic signature s of the arithmetic apparatus 30B, and write the temporary key a and the electronic signature s to the storage 70B of the arithmetic apparatus 30B, instead of the secret key 75, upon factory shipment. That is, the storage 70B stores the temporary key a and the electronic signature s. In the meantime, the storage 70B stores the common key for sharing 76, as a result of the key sharing process with the client apparatus 10A.

Specifically, in the arithmetic apparatus 30B, the storage 70B stores the electronic signature s prepared using the temporary key a, the public. key aG and the secret key 75 by the developers, and the temporary key a. The preparation unit 72 prepares the public key aG by using the temporary key a and the generator G, as an element of the finite cyclic group in which the discrete logarithm problem is difficult. Then, the output unit 36 outputs the public key aG and the electronic signature s to the client apparatus 10A via the server 20.

In the client apparatus 10A, when the validity of the public key aG is confirmed using the electronic signature s in the verification unit 61, the preparation unit 63 prepares the common key for sharing 67 by using the random temporary key b and the public key aG. Also, the preparation unit 63 prepares the public key bG by using the temporary key b and the generator G, as an element of the finite cyclic group in which the discrete logarithm problem is difficult. Then, the transmission unit 13 transmits the public key bG to the arithmetic apparatus 30B via the server 20.

In the arithmetic apparatus 30B, the acquisition unit 35 acquires the public key bG from the client apparatus 10A. The preparation unit 72 prepares the common key for sharing 76 by using the temporary key a and public key bG stored in the storage 70B.

Another example of the configuration of fixing the temporary key a for each arithmetic apparatus 30B is described. The developers determine the temporary key a for each arithmetic apparatus 30B, obtains the electronic signature s of the arithmetic apparatus 30B, and prepares the public key aG by using the temporary key a and the generator G, as an element of the finite cyclic group in which the discrete logarithm problem is difficult. Then, the developers write the temporary key a, the electronic signature s and the public key aG into the storage 70B of the arithmetic apparatus 30B, instead of the secret key 75, upon factory shipment. That is, the storage 70B stores the temporary key a, the electronic signature s and the public key aG. In the meantime, the storage 70B stores the common key for sharing 76, as a result of the key sharing process with the client apparatus 10A.

Specifically, in the arithmetic apparatus 30B, the storage 70B stores the public key aG prepared using the temporary key a and the generator G by the developers, the electronic signature s prepared using the temporary key a, the public key aG and the secret key 75 by the developers, and the temporary key a. Then, the output unit 36 outputs the public key aG and the electronic signature s to the client apparatus 10A via the server 20. Therefore, in the configuration of storing the public key aG in the storage 70B. the preparation unit 72 of the arithmetic apparatus 30B may not have the function of preparing the public key aG by using the temporary key a and the generator G, as an element of the finite cyclic group in which the discrete logarithm problem is difficult.

In the client apparatus 10A, when the validity of the public key aG is confirmed using the electronic signature s in the verification unit 61, the preparation unit 63 prepares the common key for sharing 67 by using the random temporary key b and the public key aG. Also, the preparation unit 63 prepares the public key bG by using the temporary key b and the generator G, as an element of the finite cyclic group in which the discrete logarithm problem is difficult. Then, the transmission unit 13 transmits the public key bG to the arithmetic apparatus 30B via the server 20.

In the arithmetic apparatus 30B, the acquisition unit 35 acquires the public key bG from the client apparatus 10A. The preparation unit 72 prepares the common key for sharing 76 by using the temporary key a and public key bG stored in the storage 70B.

As described above, the key sharing process is executed using the configuration of fixing the temporary key a for each arithmetic apparatus 30B and storing the temporary key a and the electronic signature s in the storage 70B, instead of the secret key 75, so that the secret key 75 can be prevented from being leaked to the outside. In the meantime, the configuration of the second modified embodiment may be combined with the configuration of the first modified embodiment. That is, the key sharing unit 60 of the client apparatus 10A of the second modified embodiment may be applied, instead of the key sharing unit 15 of the client apparatus 10 of the first modified embodiment, and the key sharing unit 70 of the arithmetic apparatus 30B of the second modified embodiment may be applied, instead of the key sharing unit 33 of the arithmetic apparatus 30A of the first modified embodiment.

In the meantime, the present invention is not limited to the embodiment and modified embodiments, and can be appropriately changed and implemented without departing from the gist of the present invention.

For example, in the embodiment. the client apparatus 10 acquires the public key for sharing 332 from the arithmetic apparatus 30. However, in a case where the public key for sharing 332 is acquired in advance and stored in the client apparatus 10, the processes of step S101 to S104 may not be executed.

Also, the method of sharing the secret key 143 and the public key PH between the client apparatus 10 and the arithmetic apparatus 30 is not limited to the above. For example, other algorithms such as DH-EKE (Diffie-Hellman Encrypted Key Exchange) may be used.

Also, in the embodiment or modified embodiments, the inference process control unit 22 determines which of the server 20 and the arithmetic apparatus 30 (30A, 30B) is caused to execute the processing layer that can be subjected to the arithmetic operation as it is as the encrypted data, in accordance with the setting. However, the present invention is not limited thereto. For example, at least one of a process load of the server 20 and a process load of the arithmetic apparatus 30 (30A, 30B) may he detected, and it may be determined which of the server 20 and the arithmetic apparatus 30 (30A, 30B) is caused to execute the processing layer, based on the process load. For example, when the process load of the server 20 is equal to or greater than a predetermined load, the inference process control unit 22 may cause the arithmetic apparatus 30 (30A, 30B) to execute the processing layer that can be subjected to the arithmetic operation as it is as the encrypted data. Also, when the process load of the arithmetic apparatus 30 (30A, 30B) is equal to or greater than a predetermined load, the inference process control unit 22 may cause the server 20 to execute the processing layer that can be subjected to the arithmetic operation as it is as the encrypted data. Thereby, it is possible to suppress the process load of the server 20 or the arithmetic apparatus 30 (30A, 30B).

Also, in the embodiment or modified embodiments, the arithmetic operation execution unit 32 (38) of the arithmetic apparatus 30 (30A, 30B) may be provided with a microprocessor that can execute a simple arithmetic equation. In this case, the inference process control unit 22 included in the server 20 outputs an arithmetic equation that is executed by the arithmetic apparatus 30 (30A, 30B). Then, the arithmetic apparatus 30 may cause the microprocessor that can execute a arithmetic equation to execute a process corresponding to the arithmetic equation input from the inference process control unit 22. In this way, even an arithmetic equation not configured as a circuit in the arithmetic apparatus 30 (30A, 30B) can be processed.

Also, the configuration of the neural network model corresponding to the process that is executed in the arithmetic system 2 is not limited to the above example. For example, more processing layers may be provided, and a processing layer that executes a process different from the above example may be included.

Also, in the embodiment and the modified embodiments, the process corresponding to the neural network model is executed in the arithmetic system 2. However, the present invention is not limited thereto. For example, a process that does not correspond to the neural network model may be executed.

Also, in the embodiment and the modified embodiments, as the homomorphic encryption, the additive homomorphic encryption has been exemplified, However, the present invention is not limited thereto. For example, the multiplicative homomorphic encryption, the fully homomorphic encryption, and Somewhat homomorphic encryption may also he used.

Also, in the embodiment and the modified embodiments, the process is executed for the data encrypted by the homomorphic encryption. However, the process may also be executed for data encrypted by other encryption methods.

Also, in the embodiment and the modified embodiments, the inference process is executed. However, the present invention is not limited thereto. For example, the present invention can also be applied to a case where a process different from the inference process is executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic apparatus comprising:
an interface that is connected to an information processing apparatus configured to process data in an encrypted state; and
a circuitry configured to execute a process, the process comprising
sharing a first encryption key and a first decryption key with a client apparatus while keeping the first encryption key and the first decryption key confidential from an outside device other than the client apparatus and the arithmetic apparatus, the client apparatus being configured to
transmit, to the information processing apparatus, encryption target data obtained by encrypting target data as a target of a process with the first encryption key,
receive encryption result data obtained by a result of a process that an arithmetic system including the information processing apparatus and the arithmetic apparatus executes on the encryption target data, and
decrypt the encrypted result data with the first decryption key corresponding to the first encryption key,
acquiring, from the information processing apparatus, encryption input data encrypted with the first encryption key or the encryption target data,
decrypting the encryption input data or the encryption target data that is acquired in the acquiring process with the first decryption key,
executing a predetermined arithmetic operation on decrypted arithmetic operation target data decrypted by the decrypting process in which the encryption input data or the encryption target data is decrypted with the first decryption key,
encrypting data of an arithmetic operation result obtained by the arithmetic operation with the first encryption key, and
outputting the data of the arithmetic operation result encrypted by the encryption process to the information processing apparatus.

2. The arithmetic apparatus according to claim 1, wherein the predetermined arithmetic operation is an arithmetic operation that cannot process data in an encrypted state.

3. The arithmetic apparatus according to claim 1, wherein the circuitry includes a plurality of circuits that executes different arithmetic operations, and
the circuitry executes the predetermined arithmetic operation, in responding to an instruction of the predetermined arithmetic operation from the information processing apparatus, by selecting a circuit that executes an arithmetic operation corresponding to the instruction and by executing the arithmetic operation on the arithmetic operation target data by the selected circuit.

4. The arithmetic apparatus according to claim 1, wherein the information processing apparatus outputs, to the arithmetic apparatus, an arithmetic equation of the arithmetic operation that is executed by the circuitry of the arithmetic apparatus, and
the executing in the process by the circuitry includes executing the arithmetic operation using the arithmetic equation inputted from the information processing apparatus.

5. The arithmetic apparatus according to claim 1, further comprising
a memory that stores a second decryption key in an unreadable manner from an outside device, wherein the sharing included in the process by the circuitry includes
acquiring, from the client apparatus, the first encryption key and the first decryption key, the first encryption key and the first decryption key being encrypted with a second encryption key corresponding to the second decryption key, and
sharing the first encryption key and the first decryption key with the client apparatus by decrypting the encrypted first encryption key and the encrypted first decryption key with the second decryption key stored in the memory.

6. The arithmetic apparatus according to claim 5, wherein the memory further stores the second encryption key, and the sharing included in the process executed by the circuitry includes acquiring a request for the second encryption key from the client apparatus, outputting the second encryption key to the client apparatus, in response to the request, and acquiring the first encryption key and the first decryption key, the first encryption key and the first decryption key being encrypted with the second encryption key by the client apparatus.

7. The arithmetic apparatus according to claim 1, wherein the sharing in the process executed by the circuitry includes generating a random first integer number, preparing a first public key by using the first integer number and a generator, as an element of a finite cyclic group in which a discrete logarithm problem is difficult, transmitting the first public key to the client apparatus via the information processing apparatus, acquiring, from the client apparatus that prepares a sharing common key by using a random second integer number and the first public key, a second public key that is prepared using the second integer number and the generator in the client apparatus and is an element of the finite cyclic group in which the discrete logarithm problem is difficult, preparing a sharing common key by using the first integer number and the second public key, acquiring the first encryption key and first decryption key encrypted using the sharing common key in the client apparatus, and decrypting the encrypted first encryption key and first decryption key by using the sharing common key prepared in the preparing to share the first encryption key and the first decryption key with the client apparatus.

8. The arithmetic apparatus according to claim 7, further comprising a memory that stores a secret key, wherein the sharing in the process executed by the circuitry further includes preparing an electronic signature by using the secret key and a hash value of the public key, and outputting the electronic signature to the client apparatus via the information processing apparatus, and the acquiring process of the first encryption key and the first decryption key includes acquiring the second public key prepared in the client apparatus and the encrypted first encryption key and first decryption key, when it is confirmed in the client apparatus that validity of the first public key is confirmed by the electronic signature.

9. The arithmetic apparatus according to claim 7, wherein the sharing common key is a value obtained by applying a hash value to a value using the first integer number and the second public key.

10. The arithmetic apparatus according to claim 1, further comprising a memory that stores a first integer number and an electronic signature prepared using the first integer number, a first public key and a secret key, wherein the sharing in the process executed by the circuitry includes preparing a first public key by using the first integer number and a generator, as an element of a finite cyclic group in which a discrete logarithm problem is difficult, outputting the electronic signature and the first public key to the client apparatus via the information processing apparatus, acquiring, from the client apparatus that prepares a sharing common key by using a random second integer number and the first public key when verification of the electronic signature is executed to confirm validity of the first public key, a second public key that is prepared using the second integer number and the generator in the client apparatus and is an element of the finite cyclic group in which the discrete logarithm problem is difficult, preparing a sharing common key by using the first integer number and the second public key, acquiring the first encryption key and first decryption key encrypted using the sharing common key in the client apparatus, and decrypting the encrypted first encryption key and first decryption key by using the sharing common key prepared in the preparing to share the first encryption key and the first decryption key with the client apparatus.

11. The arithmetic apparatus according to claim 1, further comprising a memory that stores a first integer number, an electronic signature prepared using the first integer number, a first public key and a secret key, and a first public key that is prepared using the first integer number and a generator and is an element of a finite cyclic group in which a discrete logarithm problem is difficult, wherein the sharing in the process executed by the circuitry includes outputting the electronic signature and the first public key to the client apparatus via the information processing apparatus, acquiring, from the client apparatus that prepares a sharing common key by using a random second integer number and the first public key when verification of the electronic signature is executed to confirm validity of the first public key, a second public key that is prepared using the second integer number and the generator in the client apparatus and is an element of the finite cyclic group in which the discrete logarithm problem is difficult, preparing a sharing common key by using the first integer number and the second public key, acquiring the first encryption key and first decryption key encrypted using the sharing common key in the client apparatus, and decrypting the encrypted first encryption key and first decryption key by using the sharing common key prepared in the preparing to share the first encryption key and the first decryption key with the client apparatus.

12. The arithmetic apparatus according to claim 1, wherein, the client apparatus encrypts the target data with a communication common key instead of the first encryption key and the first decryption key, and decrypts the encryption process data by using the communication common key, and, the circuitry executes a process including acquiring, from the information processing apparatus, encryption input data or the encryption target data encrypted with the communication common key instead of the first encryption key and the first decryption key, decrypting the acquired encryption input data or encryption target data with the communication common key, and encrypting data of an arithmetic operation result obtained by the arithmetic operation with the communication common key.

13. A computer system comprising:

an information processing apparatus connected to a client apparatus; and an arithmetic apparatus connected to the information processing apparatus, wherein the client apparatus comprises a first processor configured to execute a process including transmitting, to the information processing apparatus, encryption target data obtained by encrypting target data as a target of a process, with a first encryption key, receiving encryption result data obtained by a result of a process that an arithmetic system including the information processing apparatus and the arithmetic apparatus executes on the encryption target data from the information processing apparatus, and decrypting the encryption result data with a first decryption key corresponding to the first encryption key, the arithmetic apparatus comprises a circuitry configured to execute a process including sharing the first encryption key and the first decryption key with the client apparatus while keeping the first encryption key and the first decryption key confidential from an outside device other than the client apparatus and the arithmetic apparatus, acquiring, from the information processing apparatus, encryption input data encrypted with the first encryption key or the encryption target data, decrypting the encryption input data or the encryption target data that is acquired in the acquiring process with the first decryption key, executing a predetermined arithmetic operation on decrypted arithmetic operation target data decrypted by the decrypting process in which the encryption input data or the encryption target data is decrypted with the first decryption key, encrypting data of an arithmetic operation result obtained by the arithmetic operation with the first encryption key, and outputting the encrypted data of the arithmetic operation result to the information processing apparatus, and the information processing apparatus comprises a second processor configured to execute a process including receiving the encryption target data from the client apparatus, causing the arithmetic apparatus to execute an arithmetic operation that is included in the process to be executed on the target data and that cannot be executed in an encrypted state, to obtain the encryption result data, and transmitting the encryption result data to the client apparatus.

14. The computer system according to claim 13, wherein the second processor controls which of the information processing apparatus and the arithmetic apparatus is caused to execute an arithmetic operation that can be executed in any of the information processing apparatus and the arithmetic apparatus under the process, based on at least one of a process load of the information processing apparatus and a process load of the arithmetic apparatus.

15. The computer system according to claim 13, wherein the first encryption key and the first decryption key are keys conforming to a homomorphic encryption method, and the calculating in the process executed by the second processor includes executing at least a part of an arithmetic operation executed on encrypted data during the process in an encrypted state.

16. The computer system according to claim 15, wherein the process executed on the target data is an inference process that is implemented by a neural network model including a convolution layer that executes a convolution arithmetic operation and an activation layer that executes an activation arithmetic operation on an arithmetic operation result obtained by the convolution layer, the arithmetic operation executed by the second processor is at least an arithmetic operation executed on the convolution layer, and the arithmetic operation executed by the circuitry is an arithmetic operation executed on the activation layer.

17. An arithmetic method that is executed by a circuitry of an arithmetic apparatus, the arithmetic apparatus comprising an interface to be connected to an information processing apparatus, the arithmetic method including sharing a first encryption key and a first decryption key corresponding to the first encryption key with a client apparatus while keeping the first encryption key and the first decryption key confidential from an outside device other than the client apparatus and the arithmetic apparatus, the client apparatus being configured to transmit, to the information processing apparatus, encryption target data obtained by encrypting target data as a target of a process with the first encryption key, receive encryption result data obtained by a result of a process that an arithmetic system including the information processing apparatus and the arithmetic apparatus executes on the encryption target data from the information processing apparatus and decrypt the encryption result data with the first decryption key, acquiring, from the information processing apparatus, encryption input data encrypted with the first encryption key or the encryption target data, decrypting the encryption input data or the encryption target data that is acquired in the acquiring process with the first decryption key, executing a predetermined arithmetic operation on the decrypted arithmetic operation target data decrypted by the decrypting process in which the encryption input data or the encryption target data is decrypted with the first decryption key, encrypting data of an arithmetic operation result obtained by the arithmetic operation with the first encryption key, and outputting the encrypted data of the arithmetic operation result to the information processing apparatus.

18. The arithmetic method according to claim 17, wherein the predetermined arithmetic operation is an arithmetic operation that cannot process data in an encrypted state.

* * * * *